INVENTOR.
LYNDON C. COLE
BY
Oberlin & Limbach
ATTORNEYS

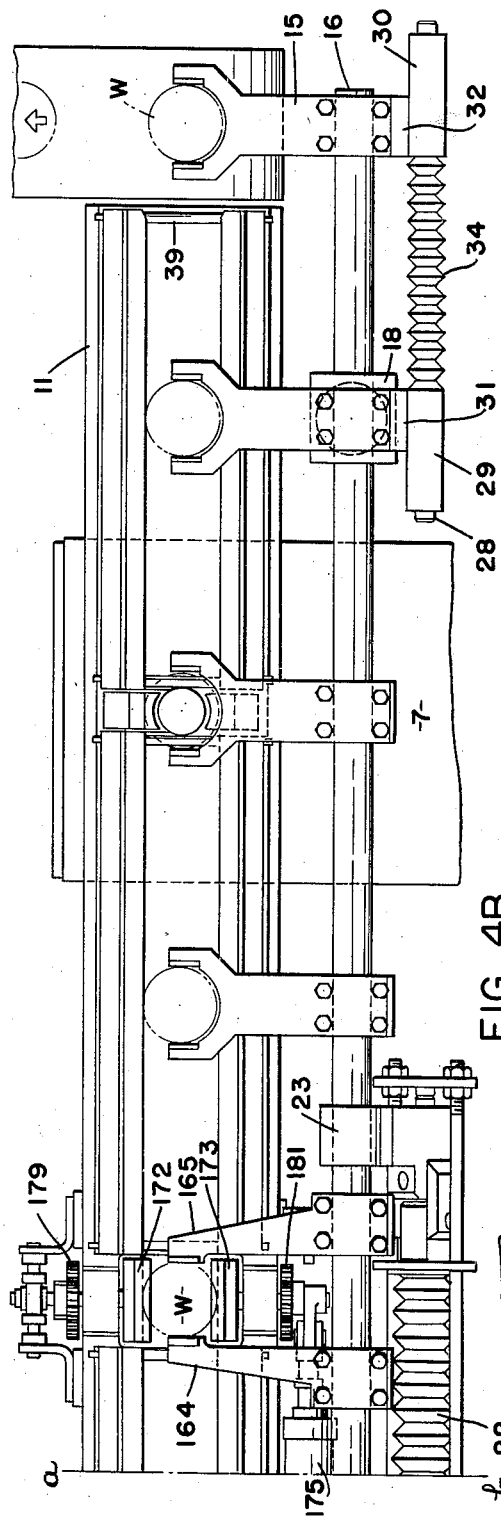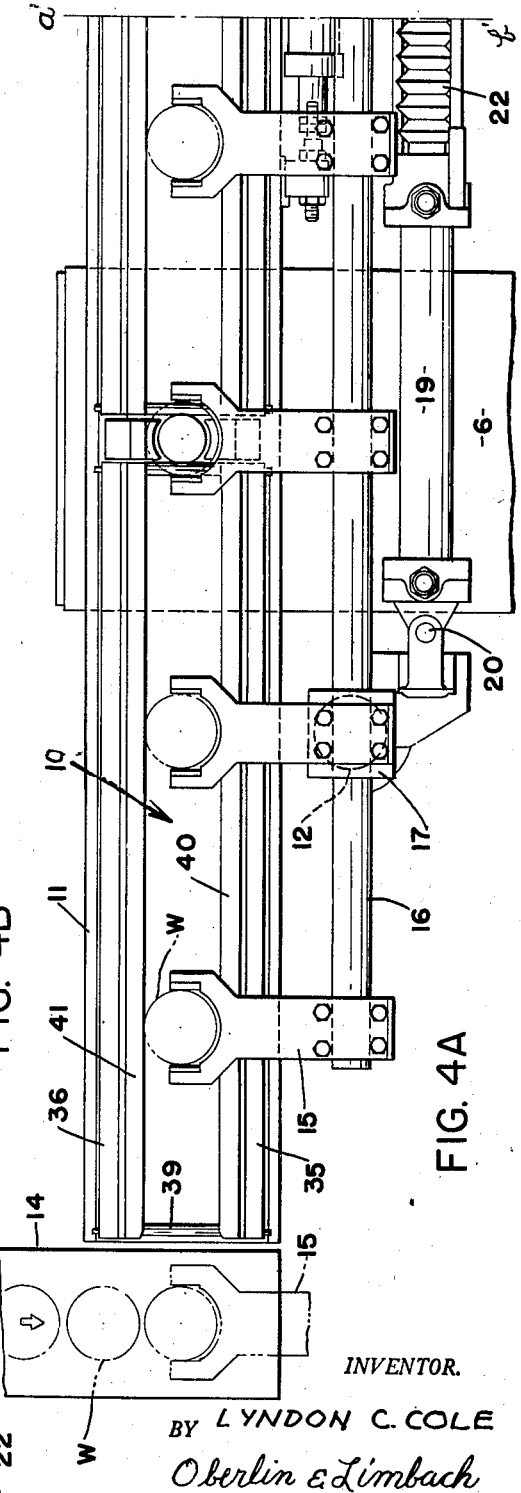

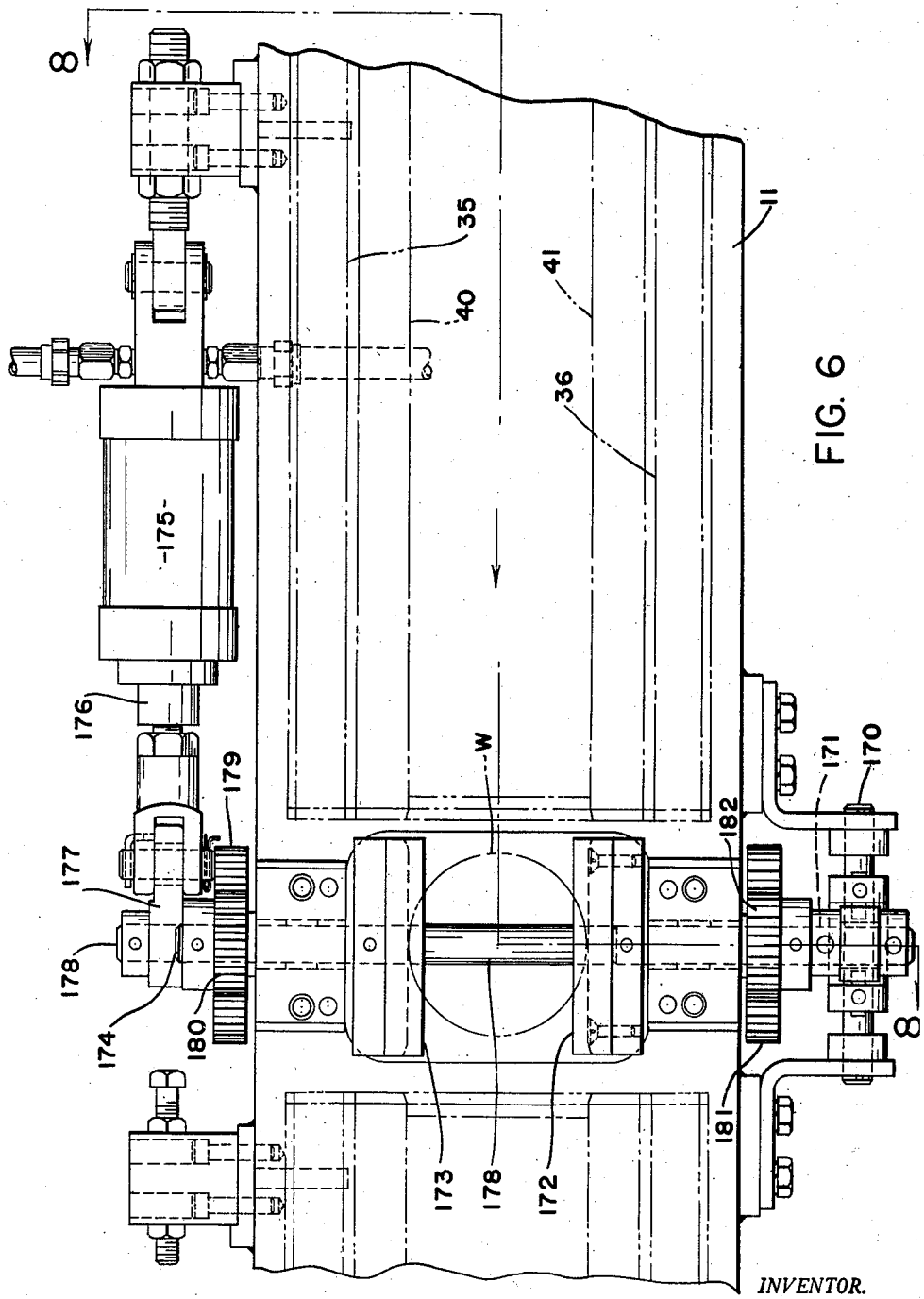

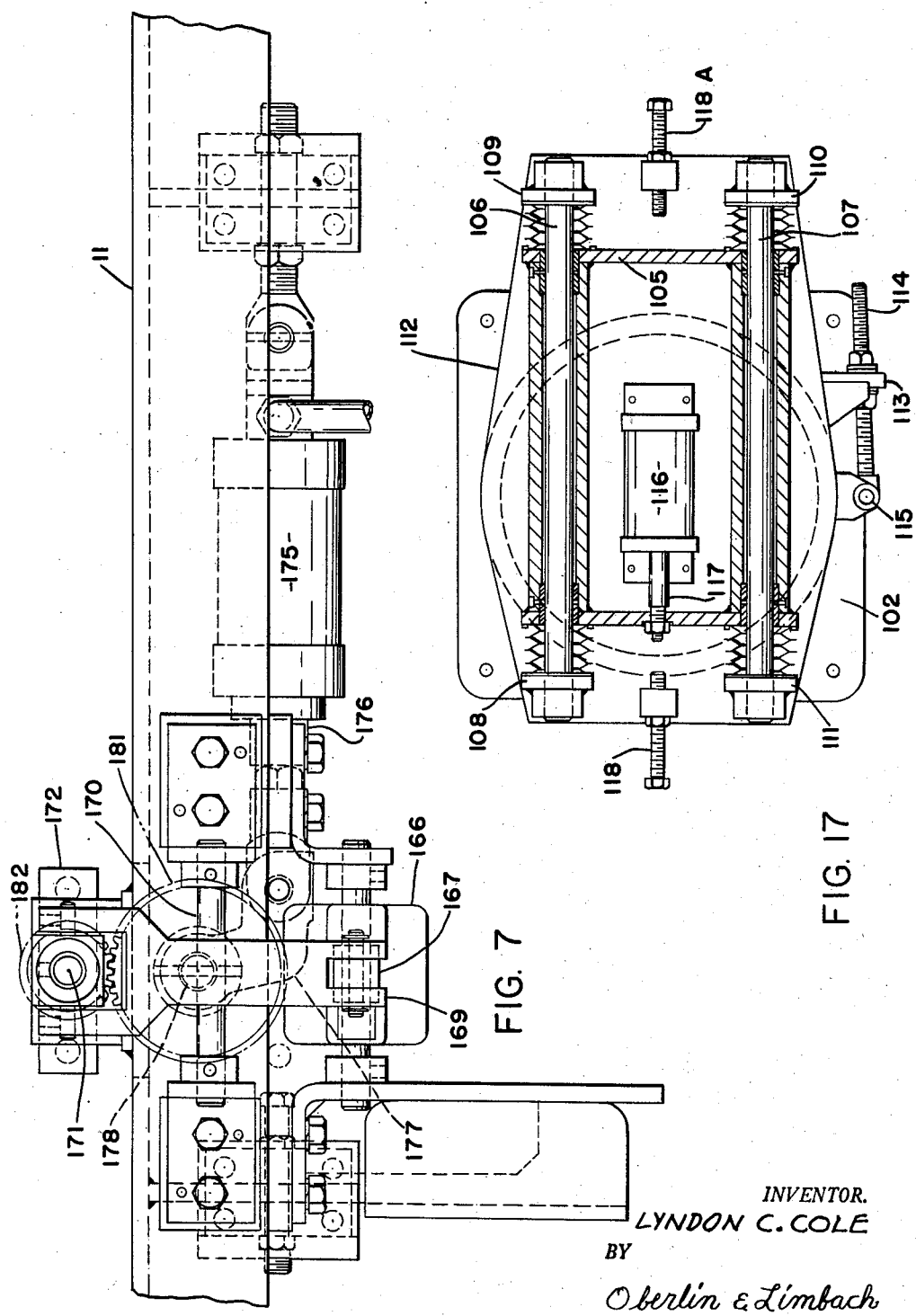

INVENTOR.
LYNDON C. COLE
BY
Oberlin & Limbach
ATTORNEYS

Oct. 20, 1959 — L. C. COLE — 2,909,015
POWER BRUSHING MACHINE
Filed Aug. 22, 1957 — 19 Sheets-Sheet 8

FIG. II

INVENTOR.
LYNDON C. COLE
BY
Oberlin & Limbach
ATTORNEYS

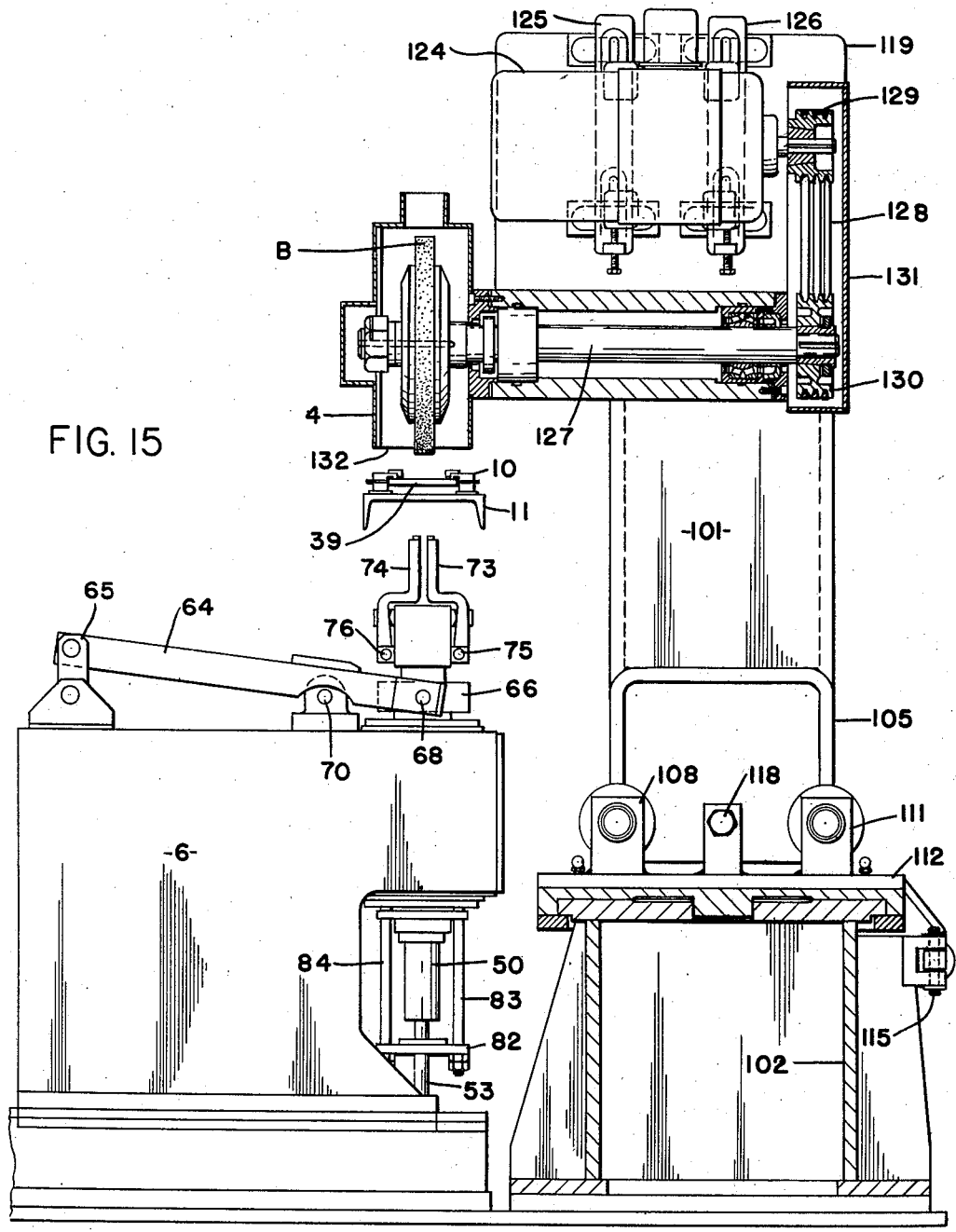

Oct. 20, 1959 L. C. COLE 2,909,015
POWER BRUSHING MACHINE
Filed Aug. 22, 1957 19 Sheets-Sheet 13

INVENTOR.
LYNDON C. COLE
BY
Oberlin & Limbach
ATTORNEYS

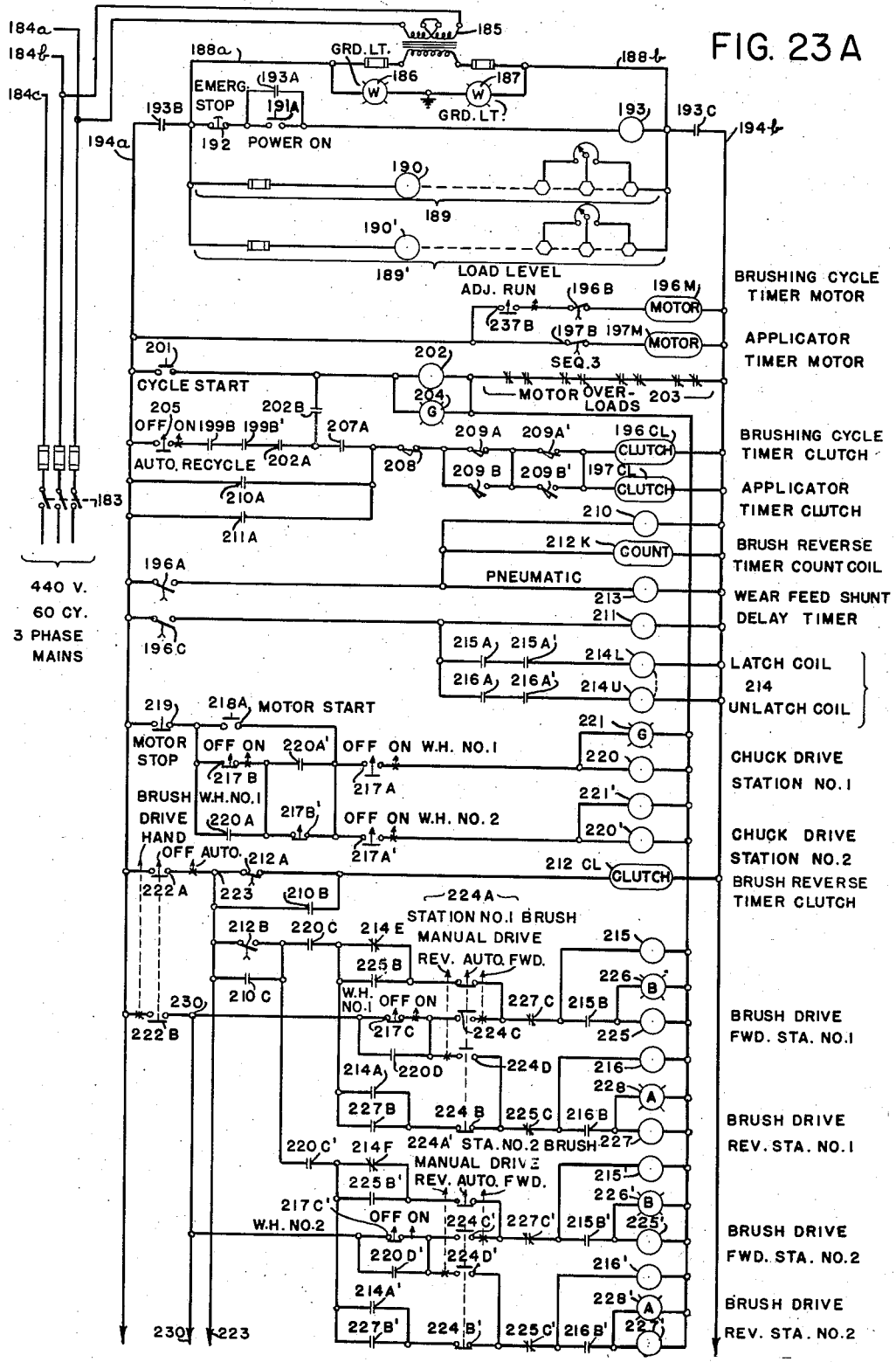

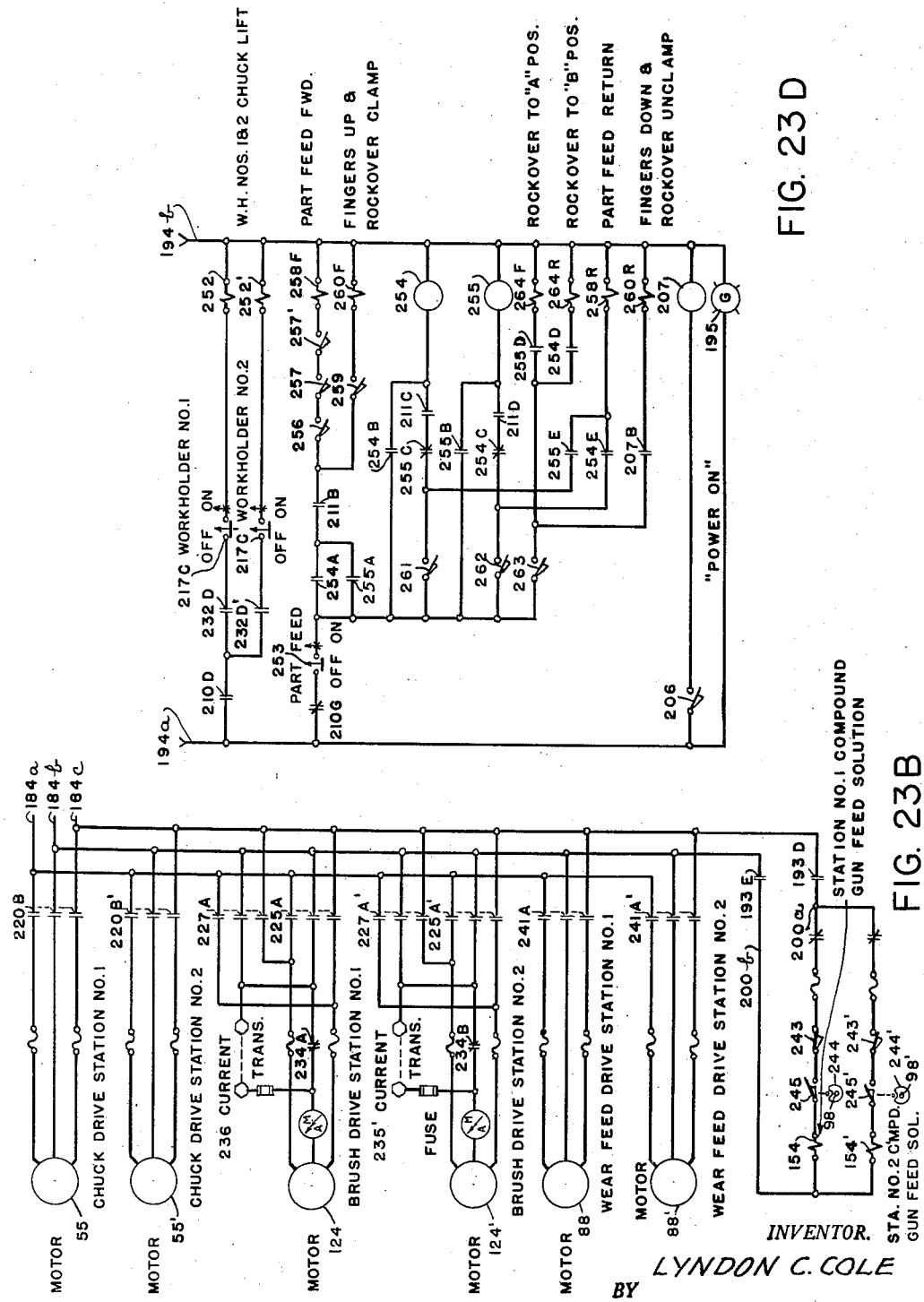

Oct. 20, 1959     L. C. COLE     2,909,015
POWER BRUSHING MACHINE
Filed Aug. 22, 1957     19 Sheets-Sheet 18

INVENTOR.
LYNDON C. COLE
BY
Oberlin & Limbach
ATTORNEYS

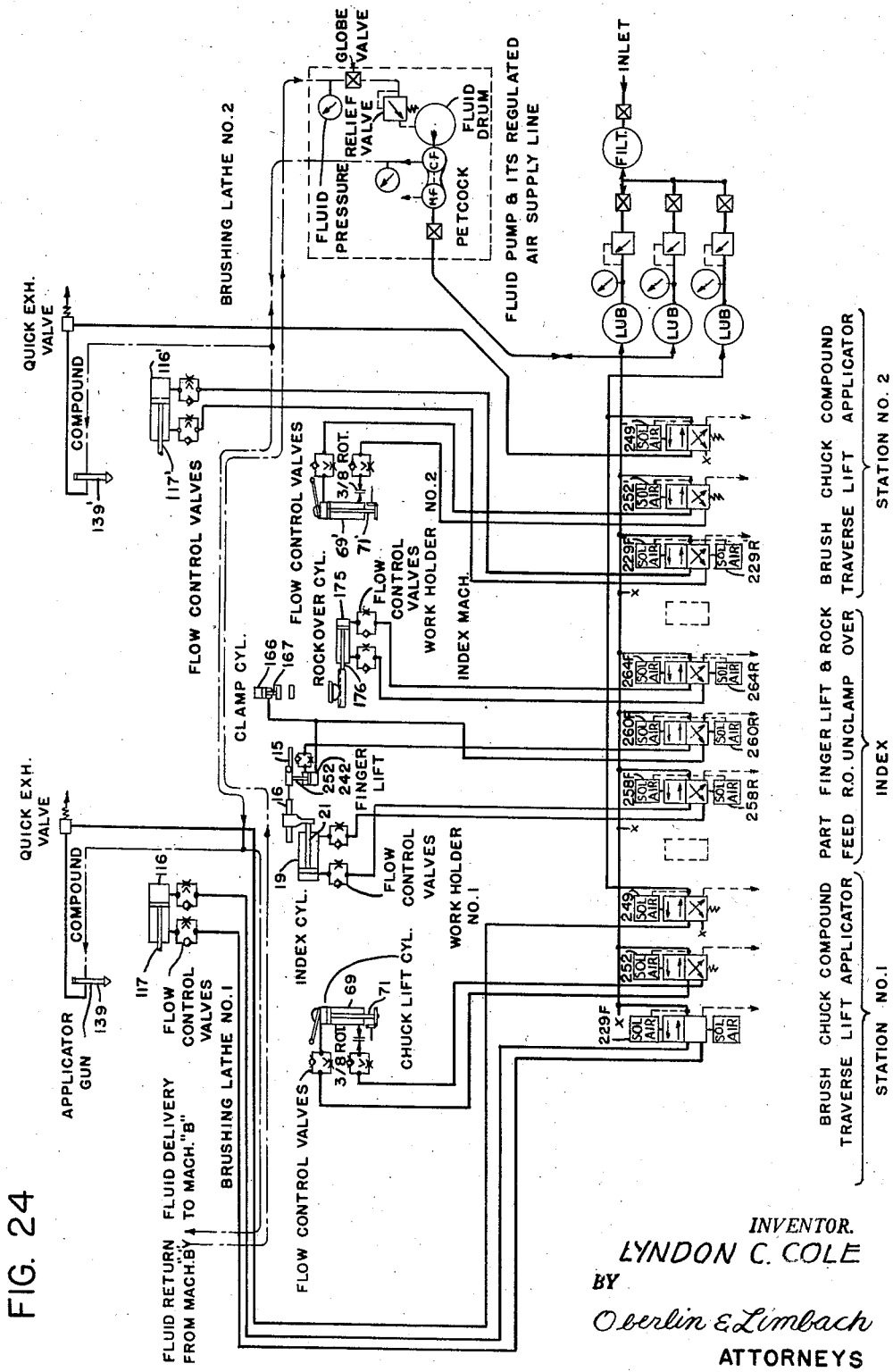

United States Patent Office 2,909,015
Patented Oct. 20, 1959

2,909,015

POWER BRUSHING MACHINE

Lyndon C. Cole, Cleveland Heights, Ohio, assignor to The Osborn Manufacturing Company, Cleveland, Ohio, a corporation of Ohio Application August 22, 1957, Serial No. 679,720

18 Claims. (Cl. 51—215)

This invention relates as indicated to a novel brushing machine, and more particularly to a machine tool utilizing power driven rotary brushes or other rotary abrading tools and adapted automatically to process and surface-finish large quantities of individual work-pieces passed therethrough.

Such machine may be incorporated in a continuous work processing line and will function continuously without the attention of an operator. Power driven rotary brushes have, of course, long been employed for the purpose of surface-finishing metal parts and other articles including the removal of burrs, scale, and oxide coatings, the rounding of sharp corners, and the provision of desired surface textures, including a high polish. When very large numbers of identical or similar parts are to be operated upon, it becomes desirable and economically feasible to provide completely automatic equipment for processing such parts. Furthermore, when the parts to be processed are of a character requiring a high degree of accuracy and uniformity, as in the case of automotive transmission gears for example, direct operator control of the process becomes additionally undesirable due to the practical certainty of at least some degree of human error in controlling the operation with resultant production of rejects, scrap, and relatively non-uniform products even though specifications may afford a rather high degree of tolerance.

It is accordingly an important object of this invention to provide a novel power brushing machine operative automatically successively to advance and process a series of individual work-pieces without the attention of an operator.

Another object is to provide such machine adapted to remove burrs and blend the edges of the teeth of gears and like articles and which will be operative thus to act upon multiple sides of such articles.

A further object is to provide chucking means automatically operative to present the work-pieces to the brushes in a manner to obtain the most effective brushing action thereon.

Still another object is to provide means for automatically maintaining the proper brushing pressure between the work-piece and the rotary brush engaging the same despite variation in part thickness or change in the brush diameter through wear and other factors.

Yet another object is to provide such machine wherein provision is made to assure a predetermined effective brushing cycle which will be uniform in the case of each individual work-piece despite wear of the rotary brushes and other variables, thereby ensuring uniform treatment.

A still further object is to provide work-piece handling means operative to turn the work-piece intermediate two brushing stations to facilitate brushing another surface thereof.

Another object is to provide means for controlling the application of an abrasive compound, and more particularly a liquid abrasive compound, to the rotating brush in a manner to ensure uniform application and a minimum of waste.

Yet another object is to provide means for traversing the spindle of the rotary brush whenever the direction of rotation of such spindle and brush is reversed to maintain uniform brushing action on a rotating work-piece.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 8:
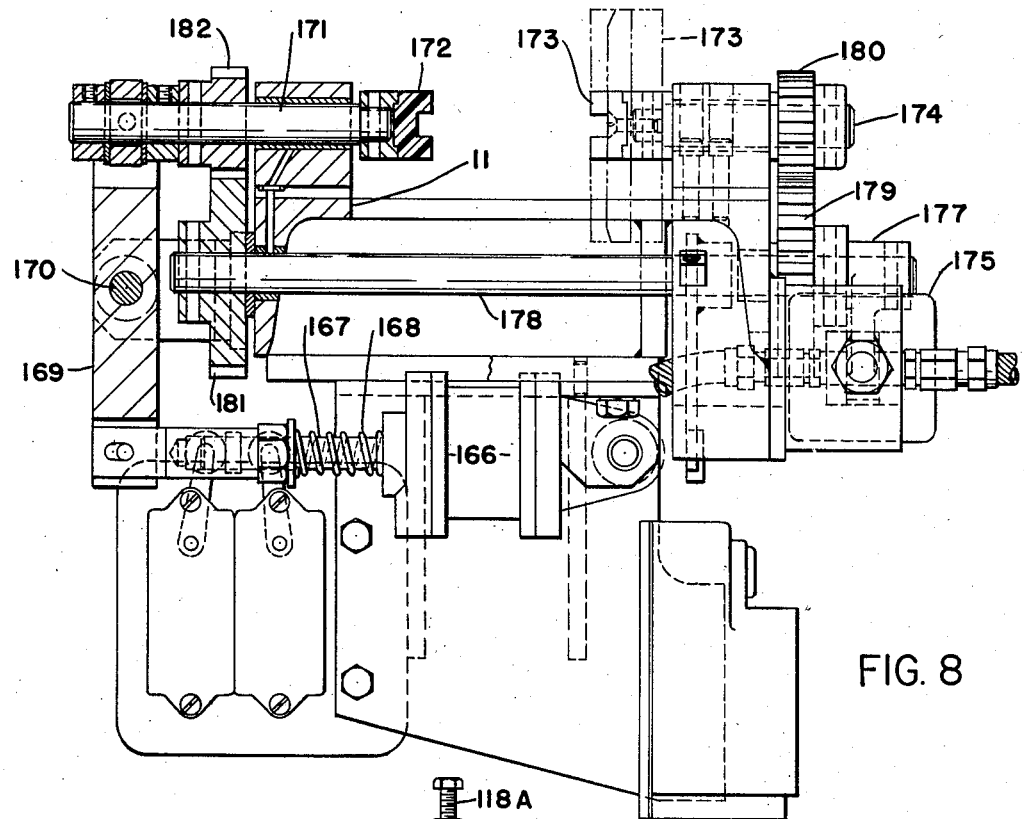
Figure 16:
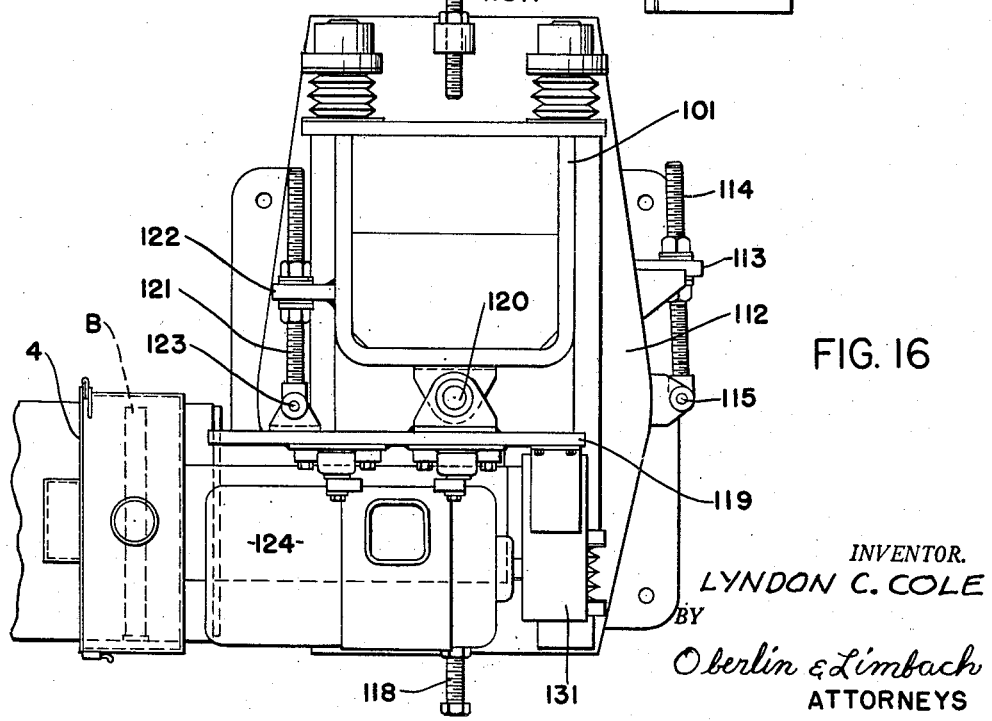
Figure 10:
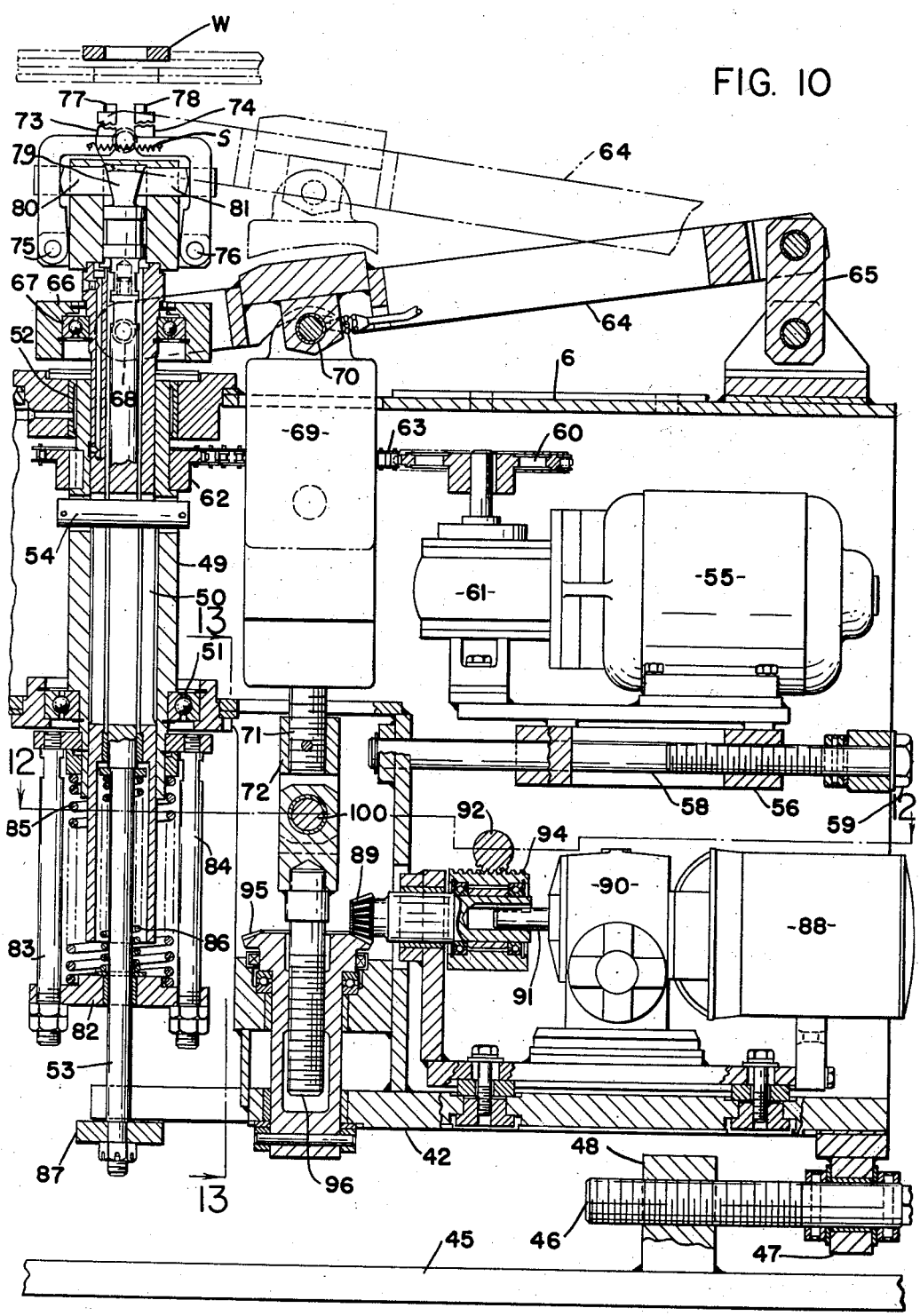
Figure 11:
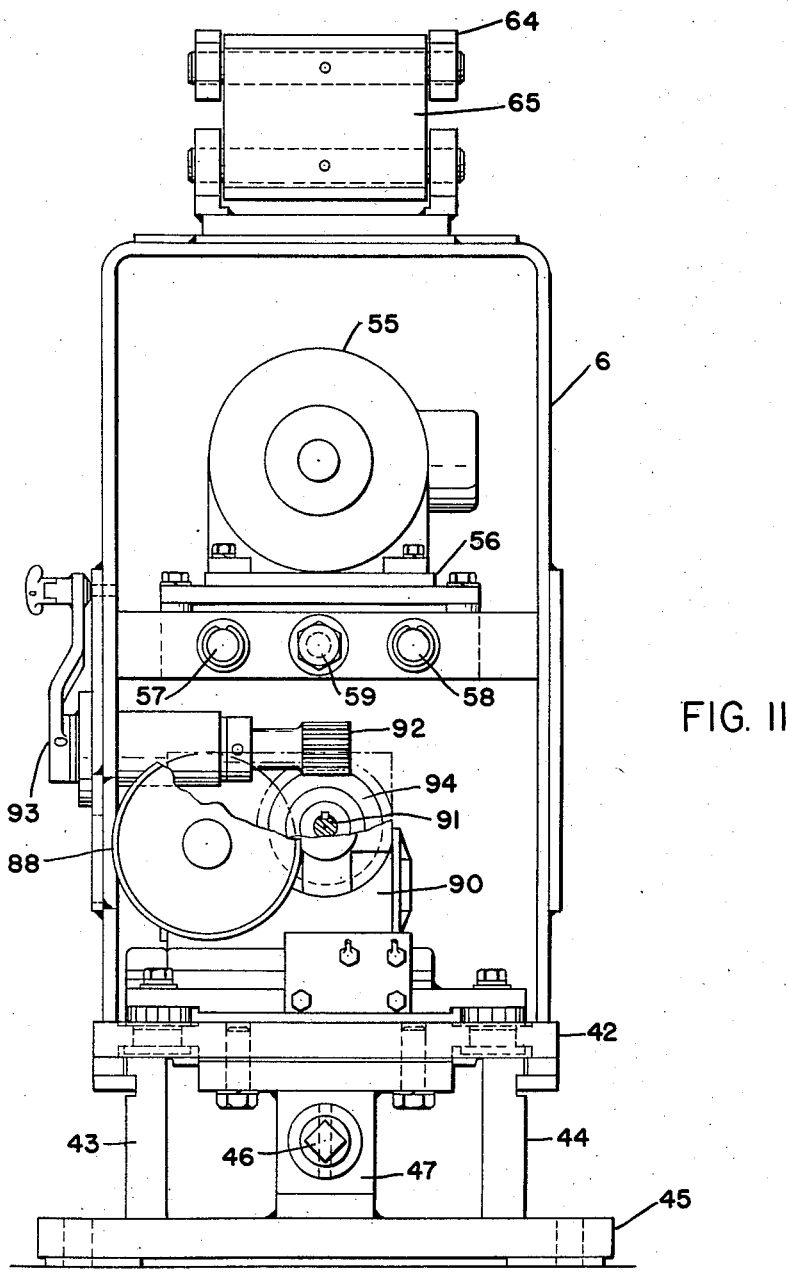
Figure 12:
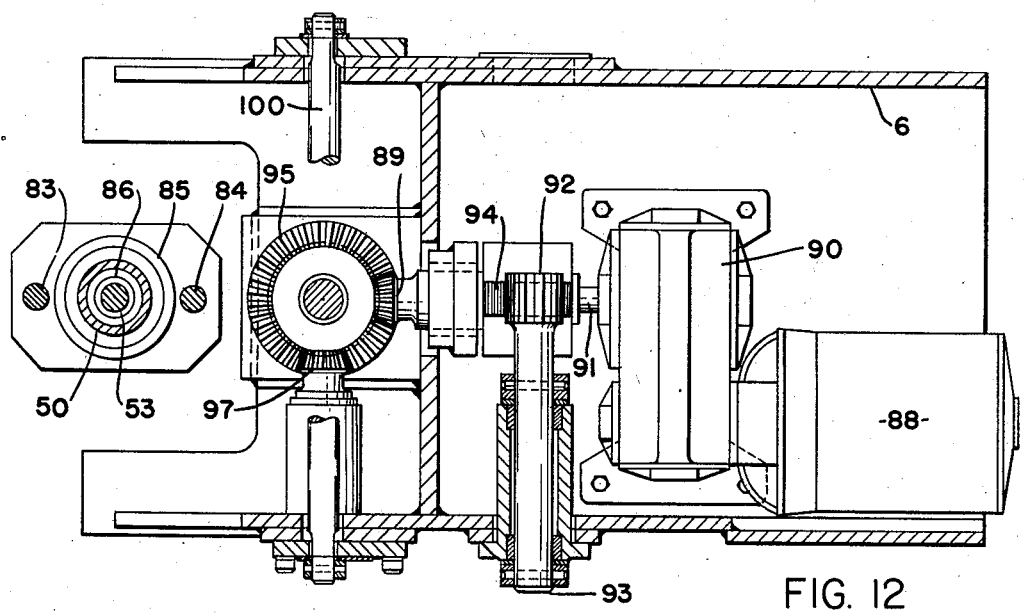
Figure 13:
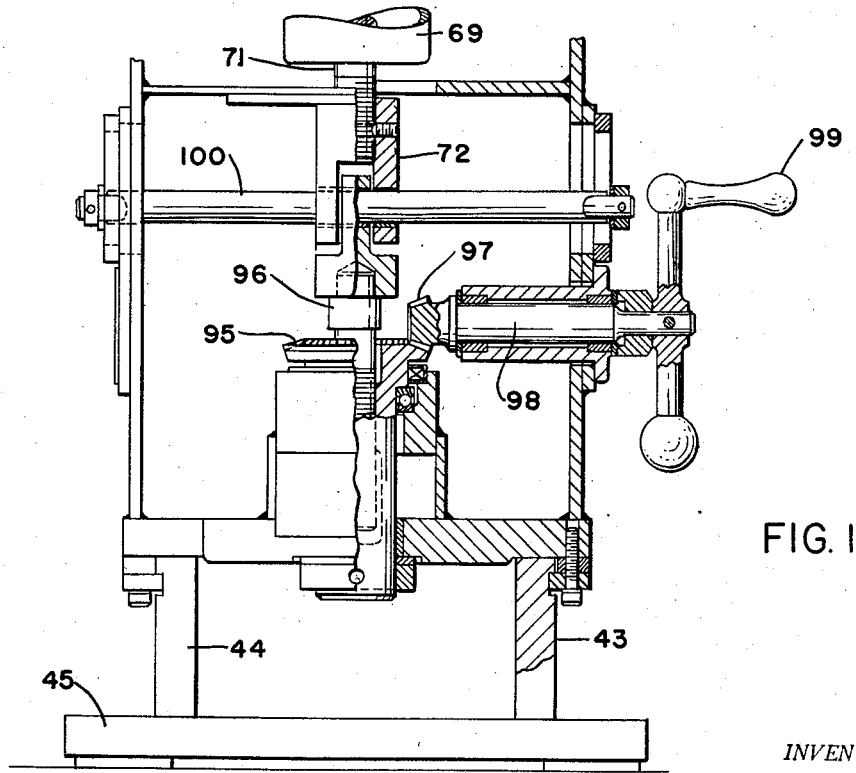
Figure 14:
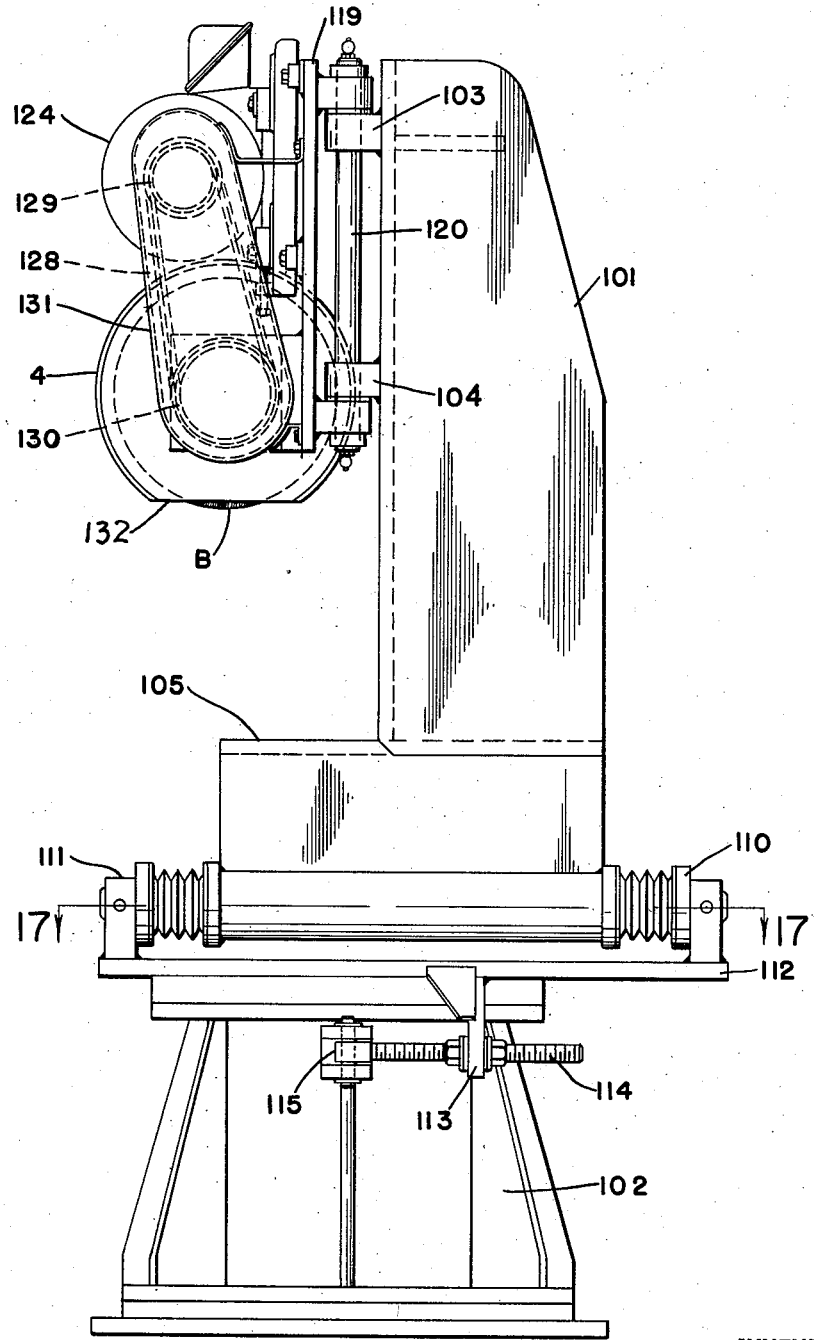
Figure 21:
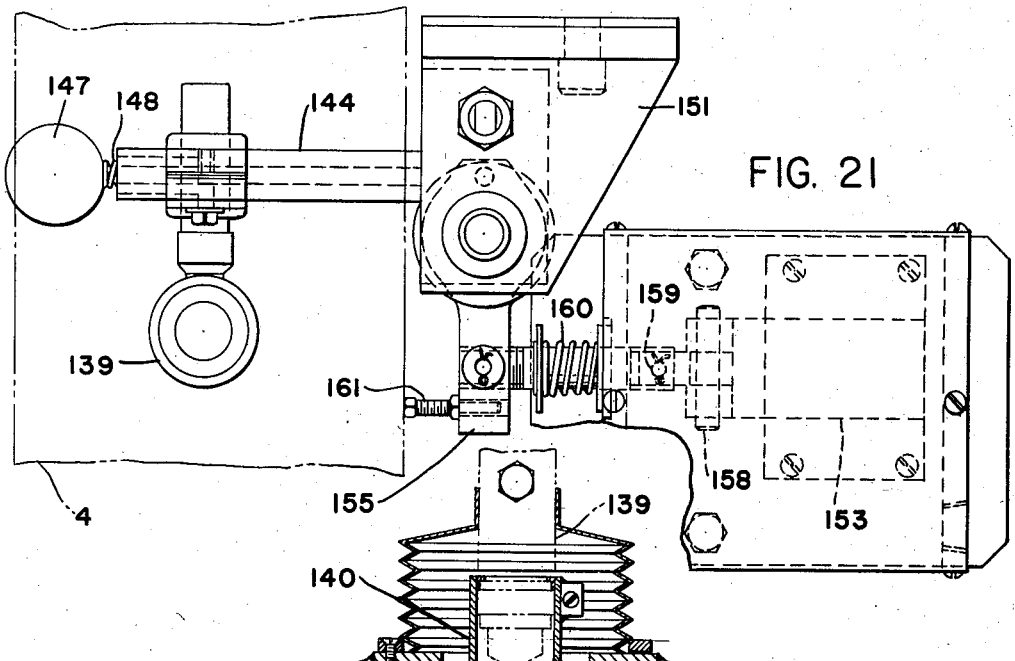
Figure 18:
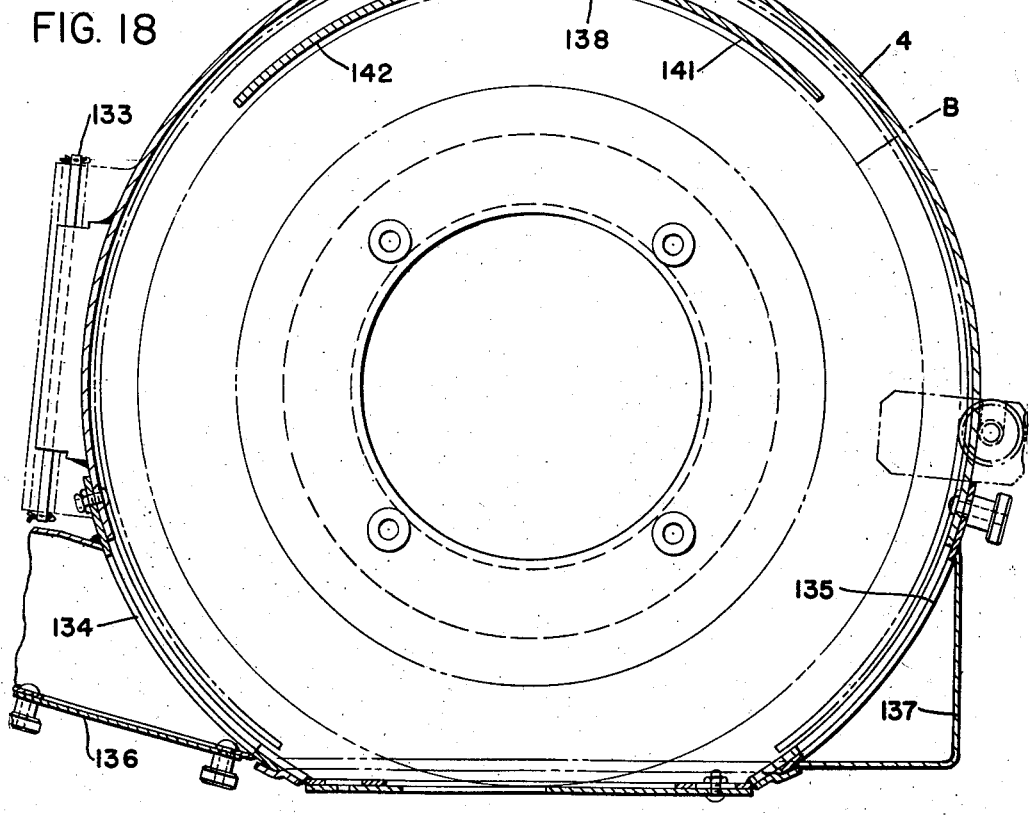
Figure 19:
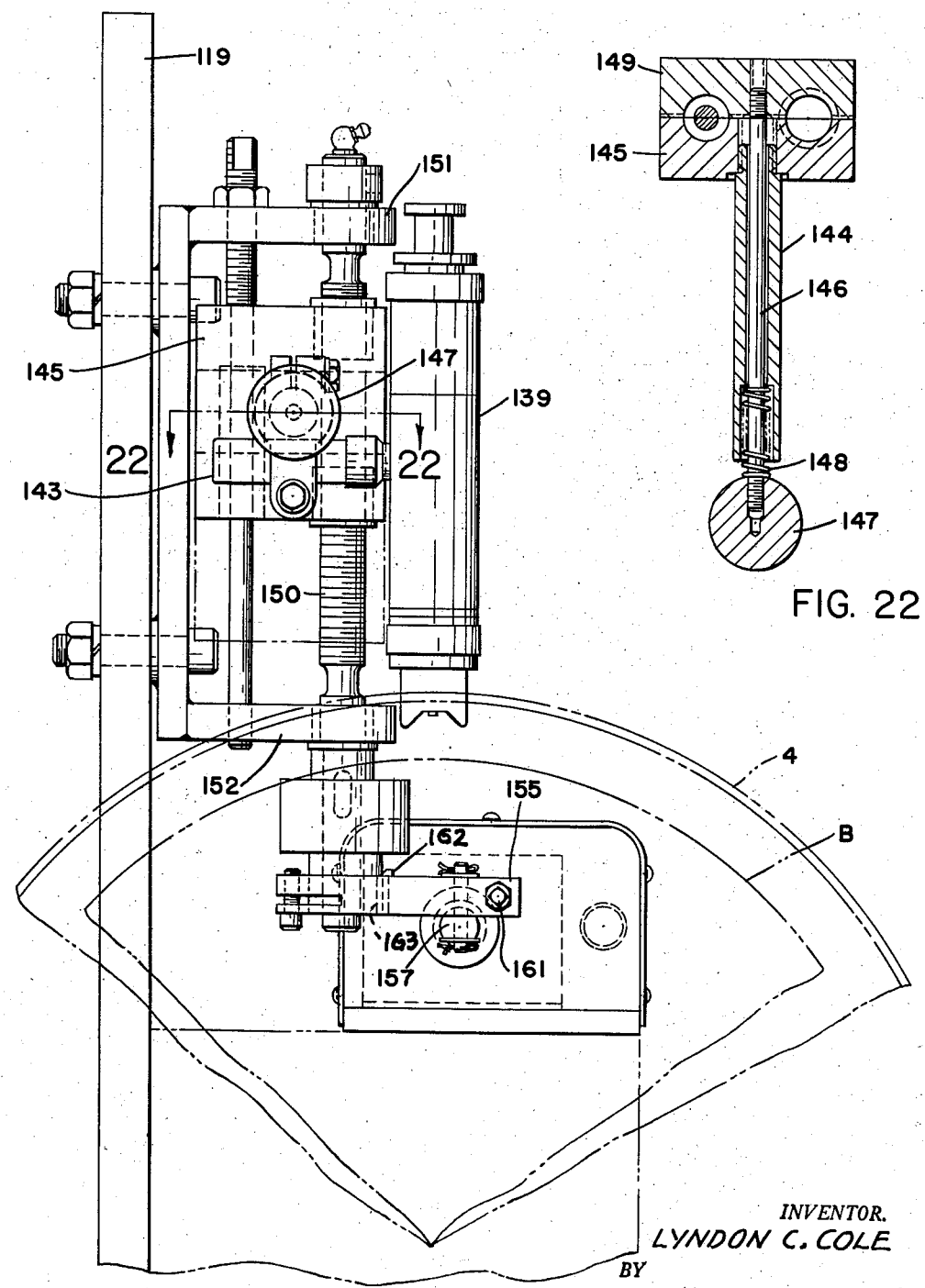
Figure 20:
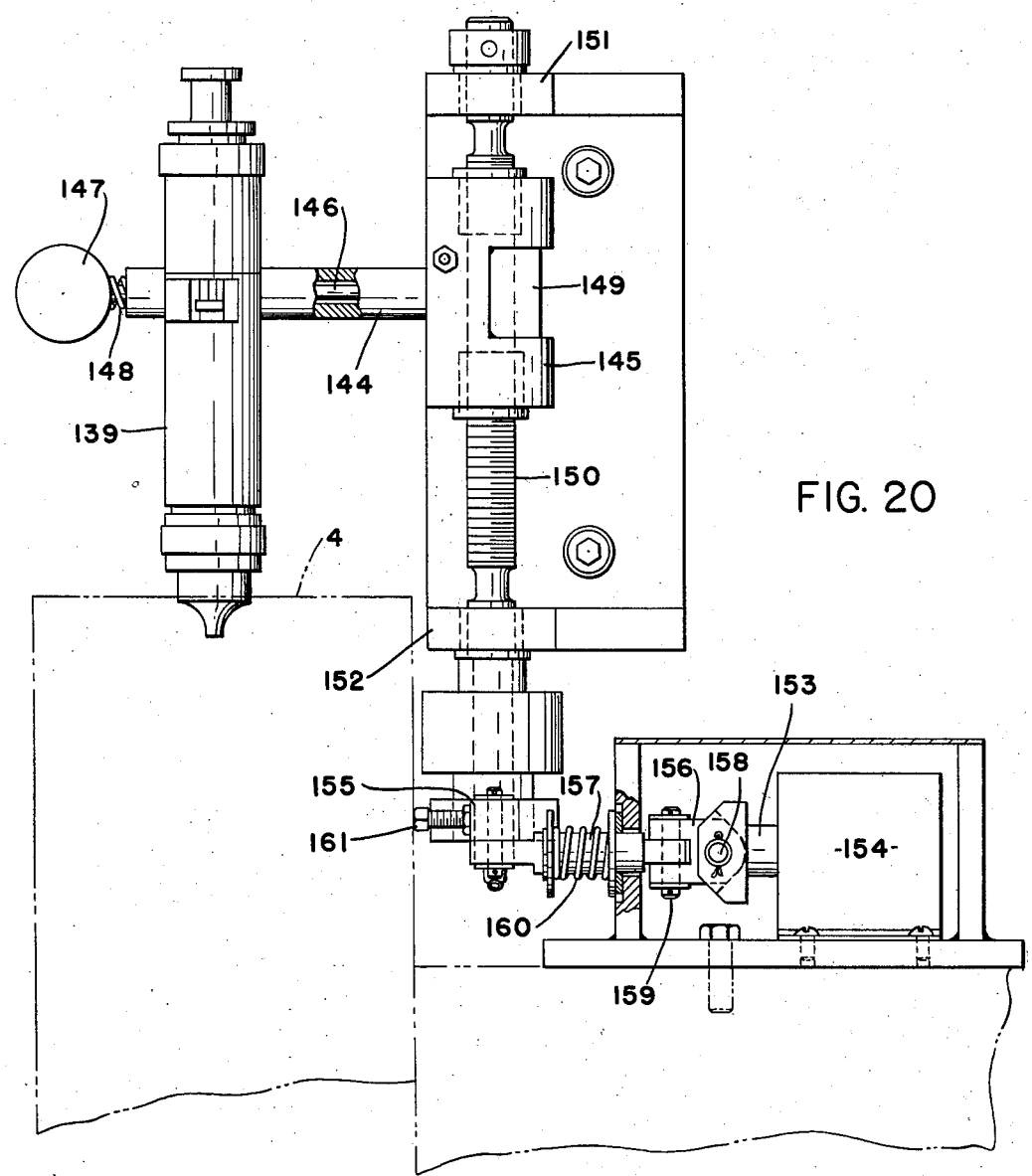
Figure 23:
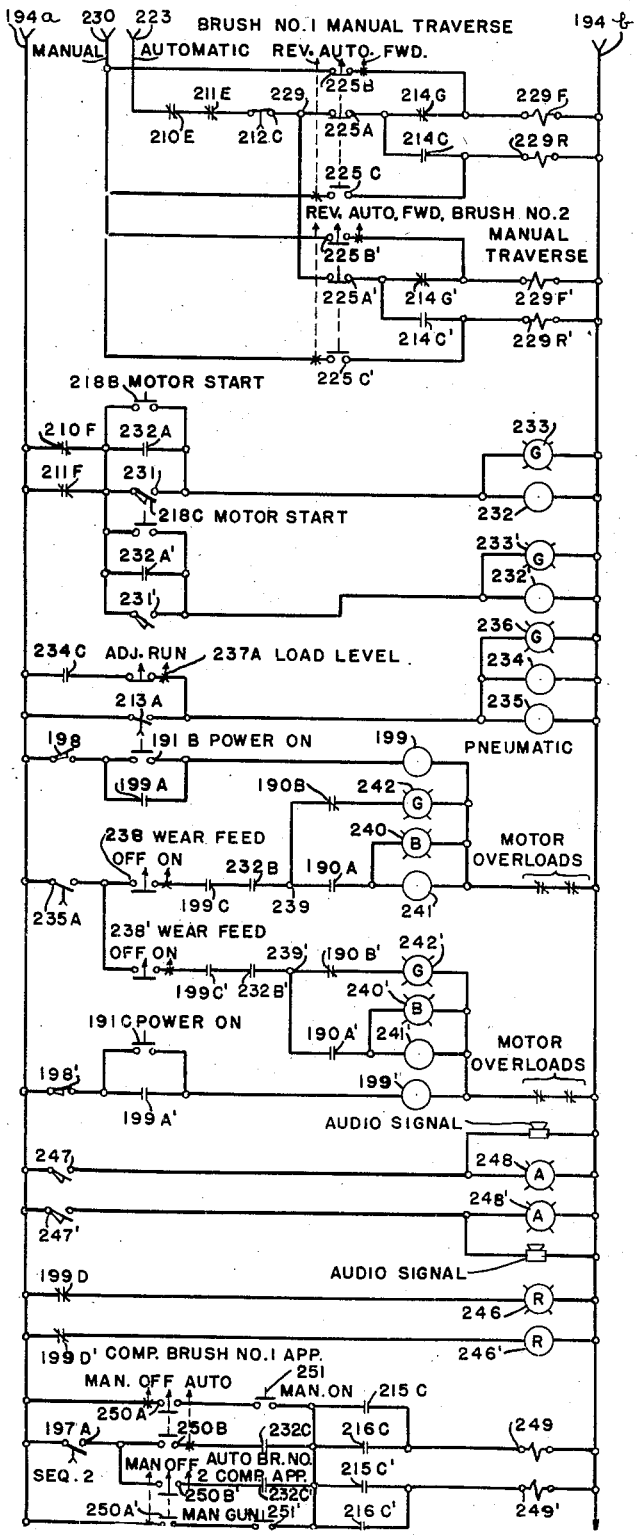

Figs. 4A and 4B together constitute a top plan view of the work-piece conveyor and associated mechanism;

Fig. 5 is an end elevation of such work-piece conveyor;

Fig. 6 is a top plan view of the work-piece turn-over mechanism;

Fig. 7 is a side view of such turn-over mechanism;

Fig. 8 is a section taken on the line 8—8 on Fig. 6;

Fig. 9 is a detail view of the work-piece supporting blocks at the turn-over station;

Fig. 10 is a vertical section through one of the work-piece holders operative to elevate the work-piece into brush engaging position;

Fig. 11 is an end elevation of such work-piece holder;

Fig. 12 is a horizontal section taken on the line 12—12 on Fig. 10;

Fig. 13 is a vertical section taken on the line 13—13 on Fig. 10;

Fig. 14 is a rear elevation of one of the brush stands;

Fig. 15 is an elevation at right angles thereto partly in section to show the brush mounting means;

Fig. 16 is a top plan view of the brush stand of Figs. 14 and 15;

Fig. 17 is a transverse section taken on the line 17—17 on Fig. 14;

Fig. 18 is a vertical section through the brush enclosing hood;

Fig. 19 is an elevational view of the brush compound applicator associated with such hood;

Fig. 20 is an elevational view of such applicator taken at right angles to Fig. 19;

Fig. 21 is a top plan view of such applicator;

Fig. 22 is a detail section taken on the line 22—22 on Fig. 19;

Figs. 23A, B, C, and D comprise a schematic wiring diagram for the control system; and Fig. 24 is a schematic fluid pressure diagram correlated therewith.

Figure 1:
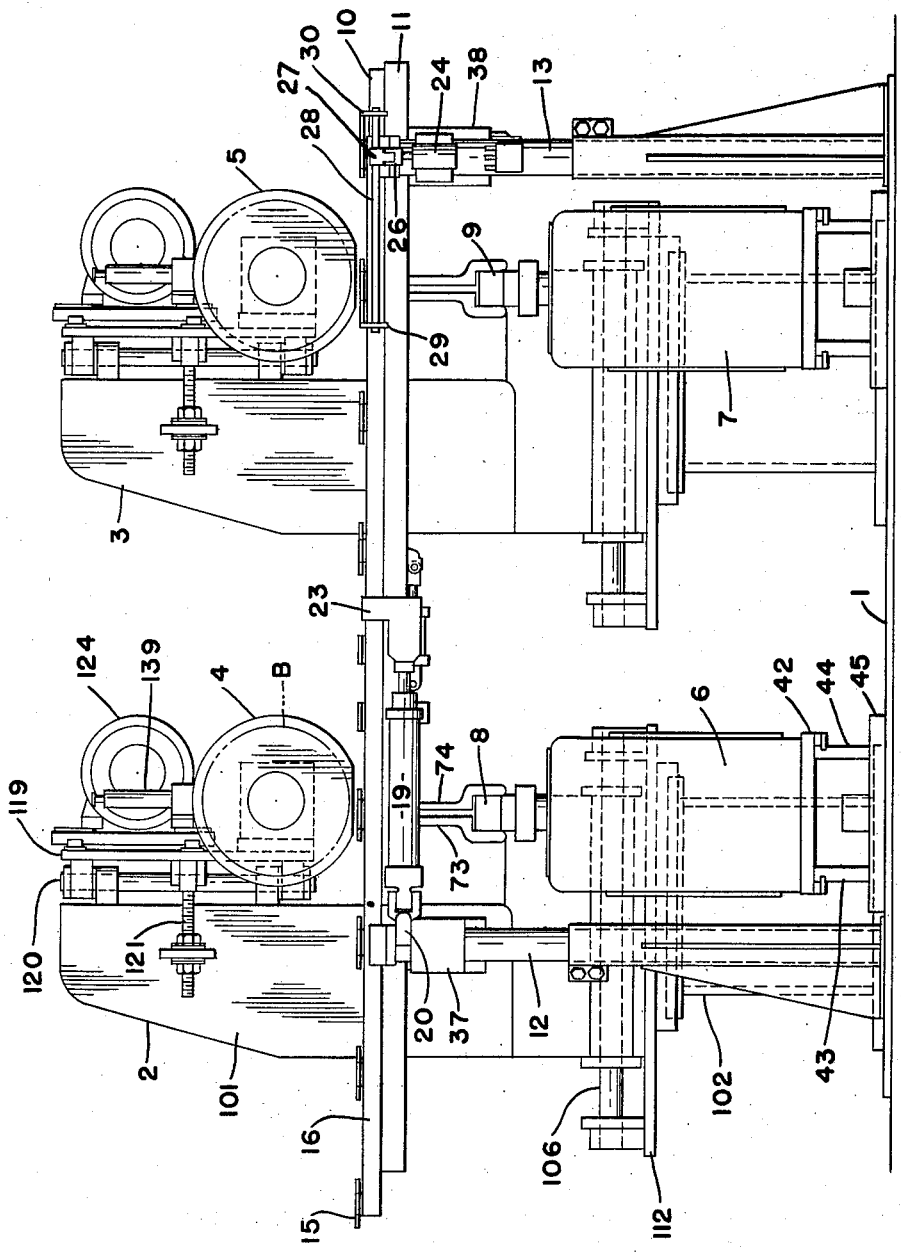
Fig. 1 is a front elevation of my new machine.
Figure 2:
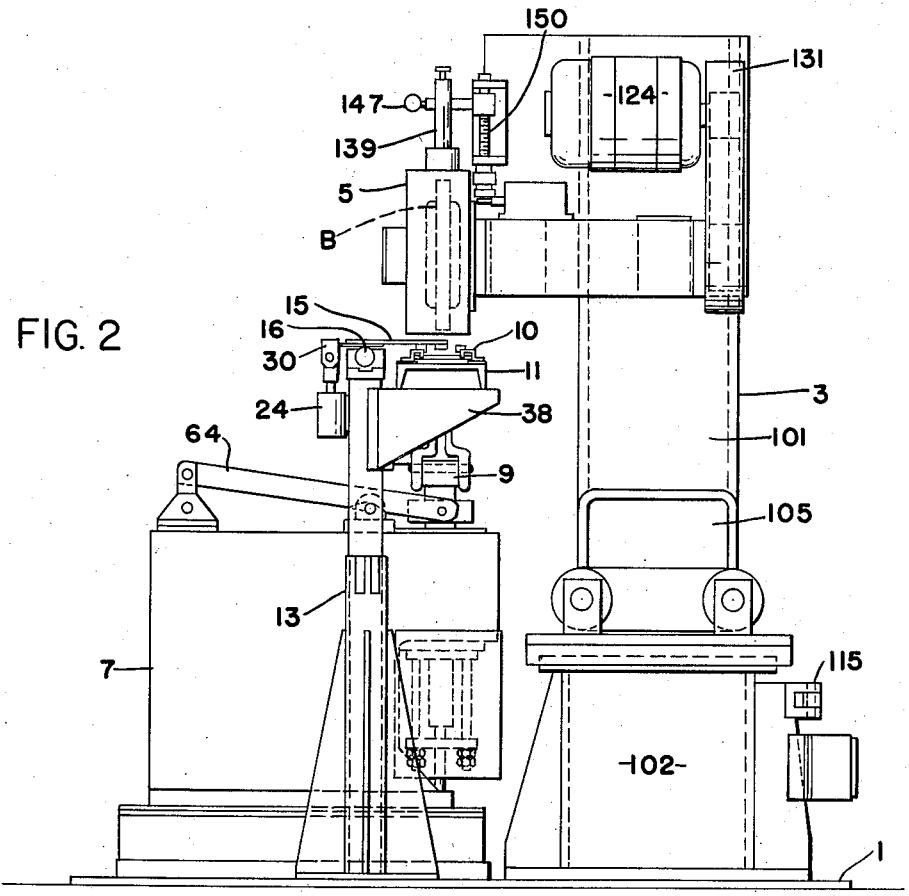
Fig. 2 is an end elevation of such machine.
Figure 3:
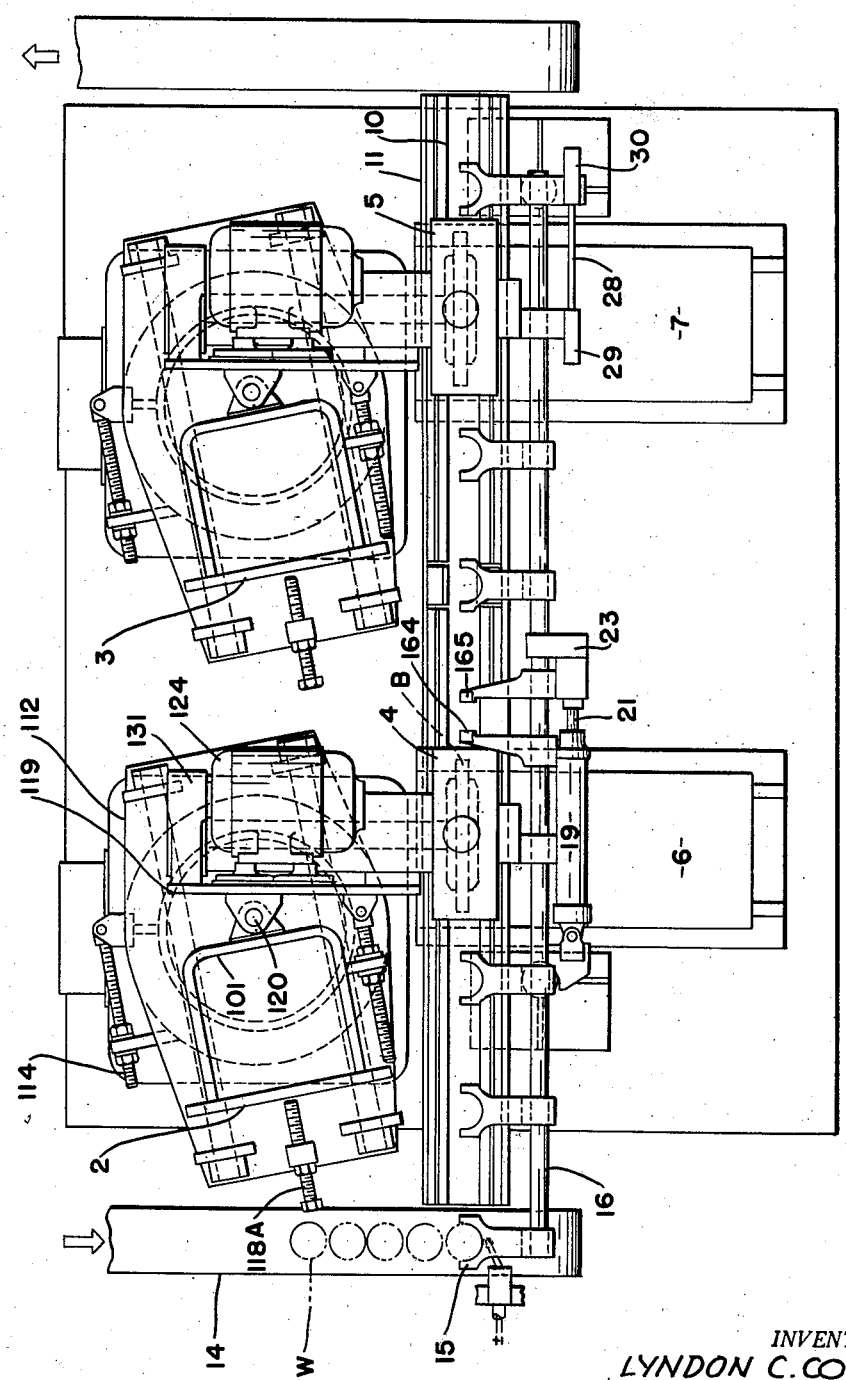
Fig. 3 is a top plan view of the machine of Figs. 1 and 2.

Now referring more particularly to said drawing and especially Figs. 1–3 thereof, the embodiment of the invention there illustrated comprises a base plate 1 on which are mounted two brushing stands 2 and 3 supporting power driven rotary brushes enclosed in sheet metal hoods 4 and 5 respectively. Stands 6 and 7 likewise supported on base 1 carry vertically reciprocable work-piece holders 8 and 9 positioned beneath such brush hoods 4 and 5 respectively and adapted to be rotated about their vertical axes. A work-piece conveyor trough 10 is carried by an inverted channel piece 11 supported on spaced pedestals 12 and 13 mounted on base plate 1, such conveyor trough extending horizontally beneath the two brush hoods 4 and 5.

Work-piece conveying and feeding system

Referring now additionally to Figs. 4A, 4B and 5 of the drawing, the work-pieces W which may, for example, be pinion gears are delivered to the machine by an inlet conveyor indicated generally at 14 where they are received by the endmost set of yoke-like fingers 15 mounted on horizontally reciprocable bar 16. Such bar 16 is journaled in blocks 17 and 18 on the upper ends of columns 12 and 13 respectively for oscillation about its axis as well as for such reciprocation. A double-acting air cylinder 19 having an externally adjustable stroke is pivotally connected to column 12 at 20, and its rod 21 (enclosed in accordion pleated sleeve 22 in Figs. 4A and 4B) is secured to collar 23 bolted to bar 16.

A second generally vertically disposed double-acting air cylinder 24 is mounted on column 13, such cylinder having an internally adjustable stroke. The upwardly extending rod 25 of such cylinder terminates in a yoke 26 pivotally connected to link 27 on rod 28. Such latter rod is supported in end brackets 29 and 30 carried by outwardly projecting lever arms 31 and 32 welded to the upper surface of bar 16. It will be apparent that rod 28 is accordingly adapted to reciprocate with bar 16, sliding through link 27, and it may be protected with accordion pleated guards such as 33 and 34. When rod 25 is reciprocated, bar 16 is rocked about its axis and the work shifting yoke fingers 15 are correspondingly lowered and raised into and out of work engaging positions.

As best shown in Fig. 5, the conveyor trough generally indicated at 10 comprises spaced elongated side elements 35 and 36 welded on the upper surface of inverted channel member 11 which is in turn supported on brackets 37 and 38 carried by columns 12 and 13 respectively. Nylon sleeves 39 are rotatably mounted on rods extending transversely between such elements 35 and 36 forming rollers to serve as the effective anti-friction work supporting bottom of the conveyor trough, and formica guard strips 40 and 41 extend along side elements 35 and 36, it being preferred that the work-pieces should not slidingly engage metal parts which might mar the same during travel through the machine. The tips of the feed fingers of yokes 15 project downwardly into the conveyor trough to engage the work-pieces and move them therealong.

It will thus be seen that a work-piece from inlet conveyor 14 will first be received by the endmost conveyor yoke fingers 15 when bar 16 has been fully reciprocated to the left as viewed in Figs. 1 and 3 (the yoke fingers being also down), bar 16 then being reciprocated to the right through the action of air cylinder 19 to move the work-piece along the nylon roller bottomed conveyor trough 10 one stage on its journey through the machine. Cylinder 24 is thereupon actuated to rock bar 16 to elevate yoke 15 out of engagement with the work-piece prior to return reciprocation of bar 16. In the machine as shown, there are eight such work transferring yokes 15 equally spaced along bar 16 except for a double space between the first four and last four such yokes. A special modified form of work transfer yoke is interposed in the middle of the series to facilitate operation of the work turn-over station in a manner explained below. It will thus be apparent that each work-piece makes a step-by-step journey through the machine and will eventually be discharged at the right-hand end of trough 10 (Fig. 4B) in a precisely positioned manner facilitating further automatic handling of the work-piece for such other operations as may be desired in a continuous production line.

The work-piece holders

The work-piece holders carried by stands or housings 6 and 7 (Figs. 1 and 2) at the two work stations are substantially identical and accordingly only the left-hand one (stand 6) will be described in detail. Housing 6 is provided with a bottom plate 42 mounted on ways 43 and 44 at right angles to trough 10. Such ways are welded to a subsidiary base 45 in turn welded to the main base plate 1 of the machine. A screw 46 (see Figs. 10 and 11) is rotatably secured in depending flange 47 affixed to the underside of bottom plate 42 and is threadedly engaged in boss 48 projecting upwardly from base plate 45. By turning screw 46 it is accordingly possible to shift housing 6 back and forth toward and away from the work supporting trough 10 and to secure such housing in adjusted position.

Supported beneath such trough is the vertically disposed work supporting spindle generally indicated at 8 in Fig. 1. Such spindle comprises a rotatable cylindrical outer spindle 49 and an inner tubular spindle 50, said outer spindle being supported in lower thrust bearing 51 and upper anti-friction bearing 52. Internally of such inner tubular spindle element 50 is pull rod 53 and both such inner tubular spindle element and such pull rod are slotted as shown to receive transversely extending key 54 secured in the outer spindle member 49 so that all three elements will rotate together but inner tubular element 50 and pull rod 53 may also be reciprocated vertically.

An electric motor 55 is mounted on a slide 56 on horizontal rods 57 and 58, a screw 59 threadedly engaging such slide adjustably to position motor 55 relative to spindle 49. Such motor drives sprocket 60 through gear reduction unit 61, and sprocket 60 drives sprocket 62 keyed to outer tubular spindle 49 through the chain belt 63 interconnecting the same. The above-described spindle elements are accordingly continuously rotated about their vertical axes during normal operation of the machine.

A rocker arm 64 is pivotally connected to the upper deck of housing 6 by means of link 65 and at its other end carries a collar 66 encircling inner tubular spindle element 50 and relatively rotatably engaging the same by means of bearing 67 for vertical reciprocation therewith. Arm 65 is pivotally secured to such collar by horizontal pivots 68. A vertically disposed air cylinder 69 is pivotally connected to arm 64 at 70, and its rod 71 is supported by a clevis 72 in a manner explained more in detail below. It will be apparent that when air is admitted to cylinder 69, clevis 72 being held stationary, arm 64 and collar 66 will be swung upwardly to lift the rotating spindle assembly.

Two conventional work chucking fingers 73 and 74 are pivotally mounted on the upper end of inner tubular spindle element 50 at 75 and 76 respectively. The extreme upper ends of such fingers 77 and 78 are shaped to fit within the inner periphery of the work-piece such as a gear, for example, firmly to engage and chuck the latter when such fingers are spread apart. The upper end of pull rod 53 is provided with a conical or wedge-shaped portion 79 engaging diametrically opposite slide members 80 and 81 reciprocably fitted in the upper end or head of inner tubular spindle member 50 and adapted to engage and spread apart such chucking fingers 73 and 74 (normally urged together by action of tension spring S) when rod 53 is pulled downwardly relative thereto.

Such rod 53 passes through a stop plate 82 adapted to be reciprocated vertically along depending rods 83 and 84. An outer coil spring 85 normally serves to hold stop plate 82 in lowermost position as shown in Fig. 10. An inner spring 86 is also interposed between plate 82 and a shoulder on rod 53 normally to prevent such rod from descending relative to inner tubular element 50. It will now be clear that when cylinder 69 is actuated to lift tubular spindle 50 with its work chucking head, rod 53 will rise therewith until stop element 87 on its lower end engages the underside of resiliently backed stop plate 82. When this occurs, wedge portion 79 is shifted relative to slide members 80 and 81 to spread fingers 73 and 74 to chuck the work-piece. Further upward movement of spindle element 50 is thereafter permitted through compression of springs 85 and 86. The stop elements 82 and 87 will be initially adjustably positioned thus to cause fingers 73 and 74 to be spread apart when finger ends 77 and 78 have entered the work-piece on the conveyor, with the work-piece thereupon being carried upwardly into engagement with the power driven rotary brush enclosed in housing 4.

As indicated above, the vertical reciprocation of the work holding spindle is effected by actuation of air cylinder 69 and the effective extent of the lift is in turn determined by the vertical position of rod supporting clevis 72. To obtain proper chucking of the work-piece and subsequent elevation thereof into proper work engaging position, it is obviously necessary to position clevis 72 at the proper elevation and it is also necessary subsequently to adjust the position of such clevis to compensate for change in the diameter of the brush due to wear. The following mechanism is provided for such purpose.

An electronically controlled servo motor 88 drives a bevel gear 89 through gear reduction unit 90, such gear being slidably keyed to drive shaft 91. A pinion 92 on manually rotatable shaft 93 engages rack 94 to reciprocate bevel gear 89 into and out of engagement with bevel gear 95 which is mounted for rotation about a vertical axis directly beneath cylinder 69. A screw 96 is pivotally secured at its upper end in clevis 72 and threadedly engages the inner periphery of bevel gear 95. Rotation of such latter gear is accordingly effective to raise or lower clevis 72, depending on the direction of rotation.

Another bevel gear 97 is carried by shaft 98 adapted to be manually turned by means of hand crank 99, such gear likewise engaging bevel gear 95. The clevis pin 100 extends through vertical slots in the respective sides of housing 6 to prevent rotation of rod 71 in cylinder 69 and thus ensure that screw 96 will turn relative to clevis 72 as above described.

During normal operation, servo motor 88 will be energized in response to brush wear in a manner explained below to drive gears 89 and 95 appropriately to adjust clevis 72 and thereby determine the starting position of the vertical stroke of the work supporting spindle. During set-up and when a new brush is mounted, for example, gear 92 may be turned to retract gear 89 out of operative engagement with main bevel gear 95 and such latter gear may then be manually rotated through the agency of crank 99 rapidly to return clevis 72 to the desired position.

*The brush heads*

The two brushing stands generally indicated at 2 and 3 in Fig. 1 are substantially identical and accordingly only the left-hand one will be described in detail below, and reference may now be had to Figs. 14–17 inclusive for such purpose.

The brush stand column 101 is mounted for pivotal movement about the central vertical axis of base 102 but is offset from such axis in its upper portion to permit vertically spaced hinge pivots 103 and 104 to be aligned with such axis. The lower portion of column 101 is a rectangular box-like housing 105 supported on parallel horizontal bars 106 and 107 carried by upstanding legs 108, 109, 110 and 111 respectively. Such legs are carried by plate 112 pivotally supported on base 102 and provided with a depending tongue 113 having a spherical washer secured therein through which a screw 114 passes, one end of such screw being pivotally secured to base 102 at 115, such screw also being free to turn about its axis in such pivotal attaching means. Consequently, housing 105 and column 101 may be swung about the vertical axis of base 102 (this being also the axis of hinge members 103 and 104) and secured in desired adjusted position.

A pneumatic piston-cylinder assembly is mounted on plate 112 within housing 105 comprising a cylinder 116 secured to such plate and a rod 117 extending therefrom secured to such housing. It is accordingly possible to reciprocate the housing and brush supporting column horizontally relative to the work conveyor trough through a stroke limited by adjustable stops 118 and 118A. Thus, by swiveling the column 101 about its vertical axis on base 102 it is possible to reciprocate such column diagonally of or directly parallel to the work conveyor trough, as desired.

The brush head 119 is pivotally secured to vertically spaced hinge members 103 and 104 by means of hinge pin 120 and is adapted to be secured in desired angular position by means of screw 121 passing through a spherical washer secured in boss 122 extending from the side of column 10, such screw being pivotally connected to brush head 119 at 123 and free to rotate about its axis relative to such pivotal connection. Such adjustments enable the point of engagement of the brush with the work-piece (such as a gear, for example) to be shifted diametrically of the latter when it is desired to reverse the direction of rotation of the brush, and thereby maintain the same approach angle of the brush to the work-piece.

Electric motor 124 is adjustably mounted on brush head 119 by means of brackets 125 and 126 and beneath it is journalled horizontal brush arbor 127 on which brush B is mounted within housing 4. Such arbor is driven through a belt drive 128 connecting motor pulley 129 and arbor pulley 130 and enclosed within guard housing 131.

As best shown in Figs. 14 and 18, the brush housing 4, ordinarily of sheet metal, is of general cylindrical form enclosing the power driven rotary brush B. An aperture 132 is provided in its underside to expose a sufficient portion of the periphery of such brush properly to engage the work-piece presented thereto by the work-piece holder described above. The outer side of the housing (the near side as viewed in Figs. 1 and 18) is hinged at 133 so that it may be swung open to expose the brush and the end of arbor 127 when it is necessary to replace the brush. Adjacent bottom opening 132 and to either side thereof are two apertures 134 and 135 through which excess abrasive compound and material removed from the work-piece are adapted to be discharged by the rapidly rotating brush, depending upon the direction of rotation of the latter. Tubular discharge vents such as 136 may be secured over such apertures and connected to flexible suction tubing (not shown) for withdrawal of such thrown-off material. Alternatively, sheet metal covers such as 137 may be secured over such apertures to close the same. Thus, as shown in Fig. 18, hood 4 is arranged for use with a rotary brush rotating in a clockwise direction and which does not require periodically to be reversed. When such periodic brush reversal is required, outlet vents such as 136 will then be connected to both outlet 134 and 135, such tubular vents extending generally tangentially of the brush perimeter in the direction of rotation of the brush. There is accordingly minimum opportunity for build-up within the hood. An upper opening 138 may be provided in hood 4 for insertion of an abrasive compound applying device such as spray gun 139. Clamped to such spray gun is a tubular sleeve 140 carrying curved baffle plates 141 and 142 extending a substantial distance in each direction circumferentially of brush B. Each of such plates may, for example, extend about one-eighth of the brush periphery. Means is provided as described below for advancing gun 139 as the brush wears down in use and baffle plates 141 and 142 are accordingly maintained in close proximity to the brush face. They greatly minimize the windage layer produced by the brush rotation and thereby facilitate penetration of the abrasive compound into the brush rather than permitting the same to be prematurely thrown off.

*Compound spray gun mounting*

Referring now more particularly to Figs 19–22 inclusive of the drawing, the mounting means for the spray gun 139 is there shown whereby such gun may be automatically advanced toward the face of brush B. Such spray guns and the pump systems for supplying fluid abrasive compound to the gun are commercially available and well known in the art, being procurable from J. J. Siefen Company of Detroit, Michigan, for example. Gun 139 extends vertically downwardly and is supported by a cross-arm 143 adjustably clamped to tubular arm 144 secured in block 145. A reciprocable plunger 146 extends through tubular arm 144 and is provided with a knob 147 at its outer end, a compression spring 148 being interposed between such knob and a shoulder in tube 144. The other end of rod 146 is threadedly engaged in clamping block 149 adapted to cooperate with block 145 threadedly to engage lead screw 150 carried in upper and lower brackets 151 and 152 mounted on brush head 119. Accordingly, through rotation of such lead screw, gun 139 may be raised or lowered. By manually pressing on knob 147, clamping blocks 145 and 149 may be disengaged from such lead screw to permit manual adjustment of the gun position.

The plunger 153 of solenoid 154 is pivotally connected to ratchet arm 155 by means of links 156 and 157 joined by pivots 158 and 159 at right angles to each other. Compression spring 160 serves normally to maintain plunger 153 extended and ratchet arm 155 rocked in a clockwise direction (Fig. 21) to the extent permitted by adjustable stop screw 161 which contacts the side of brush housing 4. The ratchet detent 162 on arm 155 engages the ratchet teeth 163 and thereby turns lead screw 150 to an extent determined by the setting of stop 161. Such rotation of lead screw 150 serves to advance gun 139 toward the brush. It has been found very important thus to maintain the gun at the optimum distance from the brush face to ensure maximum utilization and minimum dispersion of the brushing compound.

*Work-piece turn-over mechanism*

Upon completion of a brushing cycle, the air is exhausted from cylinder 69 (Fig. 10) and as the spindle assembly moves downward, the work-piece is unchucked and redeposited on the nylon rollers of the conveyor trough. The feed system thereupon moves such work-piece along the trough and simultaneously brings another work-piece to the first brushing station for processing.

It is now desired to turn such work-piece over in order that its other side may similarly be brushed. The work-piece W is transported to the turn-over station by spaced fingers 164 and 165 (Fig. 3) corresponding to yoke fingers 15 but separately clamped to bar 16 to avoid interference with the turn-over mechanism. When bar 16 is rocked to swing such fingers up out of the way, air is exhausted from single-acting cylinder 166 to permit rod 167 to be advanced under the action of compression spring 168, thereby rocking lever 169 about pivot 170 to reciprocate rod 171 carrying clamping jaw 172 and thereby grip the work-piece between such jaw and opposed jaw 173. Both such jaws will preferably be of a tough wear-resistant plastic material such as Micarta.

Rod 171 carrying the jaw 172 and rod 174 carrying opposed jaw 173 are also journalled for rotation about their axes, a gap being provided in the conveyor trough in this region. The work-piece W is slid into jaws 172 and 173 by feed fingers 164 and 165 prior to advancing jaw 172. Upon now admitting air to double-acting cylinder 175, piston rod 176 is reciprocated to rock crank 177 keyed to shaft 178 to which is also keyed pinion gear 179 engaging gear 180 keyed to shaft 174, and to which is also keyed pinion gear 181 meshed with gear 182 keyed on shaft 171. In this manner, jaws 172 and 173 are simultaneously rotated about the common axis of rods or shafts 171 and 174 180°, thus turning the work-piece over. The yoke feed fingers 15 are elevated before performing such turn-over operation and the feed bar is shifted to the left (Fig. 1) with such fingers still raised. The bar 16 is then rocked to lower the feed fingers simultaneously with unclamping of the turned over part.

Having been thus turned over and unclamped, the work-piece is now advanced by the feed system to the second brushing station where it is checked and an identical brushing operation performed thereon.

*Detailed operation and controls*

The operation of the machine and the control of the mechanical components described above may best be understood by referring to Figs. 23A, B, C and D and Fig. 24 of the drawing. Upon closing main disconnect switch 183, 440 volt 60 cycle power is brought to the main lines 184a, b and c, and 110 volts is produced for the control circuit in the secondary of transformer 185, causing the ground lamps 186 and 187 to be illuminated on the control panel. A potential of 110 volts is thus also impressed across the legs 188a and 188b of the circuit to which are connected the electronic circuits 189 and 189' comprising the brush drive motor load controls for the respective brushing stations (these being standard units commercially available from suppliers such as Machinery Electrification, Inc.). Such electronic circuits are thus powered prior to actual initiation of the operating cycle to allow tube warm-up time. Load relays 190 and 190' are thereby now energized for the respective brushing stations.

Upon manually depressing the "power-on" button 191, thus closing its normally open contact 191A in series with the normally closed "emergency-stop" button 192, contactor 193 is energized closing normally open contact 193A (in parallel with button contact 191A) which maintains the circuit through the 193 coil. Upon energization of contactor 193, normally open contacts 193B and C are closed bringing 110 volts to the main legs 194a and 194b of the control circuit causing pilot light 195 to be illuminated on the control panel and starting the motors 196M and 197M of timers 196 and 197. These timer motors are energized before the start of the actual cycle time to allow reaching full speed to ensure accurate subsequent timing. With power across legs 194a and b of the circuit, and button 191 depressed, closing its normally open contact 191B in series with normally closed limit switch contact 198, control relay 199 is energized and held energized through its parallel wired contact 199A. Control relay 199' is energized and held in a similar fashion. The function of these relays is to be explained more fully as the description proceeds. Additional normally open contacts 193D and 193E of contactor 193 close when 193 is energized to bring 440 volts to legs 200a and 200b of the circuit to provide power for solenoids 154 and 154' to be explained more fully as the description proceeds.

"Cycle start" button 201 is now manually operated to energize holding relay 202 thereby closing normally open contacts 202A and B to maintain automatic cycling, provided that none of the overloads 203 of any of the motors of the machine are in use. A green light 204 on the control panel indicates that the automatic recycle has been started. If it is desired for set-up purposes merely to institute a single machine cycle without automatic cycle repetition, this "cycle start" button 201 will again be depressed as seen later.

The manual "automatic recycle" selector switch 205 is used to maintain continuous machine operation. Such operation is possible if contacts 199B and 199B' are closed as described below, contacts 202A and B are closed, and feed bar 16 being to the left as seen in Fig. 1 closing the normally open contact of limit switch 206 thereby energizing control relay 207 and closing its normally open contact 207A, the feed fingers 15 being in down position (so that normally open contacts of limit switch 208 are closed), and both brushing columns such as 101 have been traversed to one or the other of their extreme positions (either the normally open contact 209A or 209B of limit switch 209 and the normally open contact 209A' or 209B' of limit switch 209' being closed). Upon the above prerequisites to operation being satisfied, the clutch 196CL of timer 196 (brushing cycle) and the clutch 197CL of timer 197 (applicator time) engage and start to time-out as the cycle progresses. With clutch 196CL engaged, contact 210A is closed and later during the cycle contact 211A is closed, the cause of which is to be described below, maintaining the clutches 196CL and 197CL engaged by means of a parallel circuit until such a time as limit switch contact 208 opens through action to be explained more fully as the description proceeds.

The contacts 196A are closed upon engaging of the timer 196 clutch 196CL, and control relay 210 is energized to close its normally open contacts 210A, B, C and D and open its normally closed contacts 210E, F and G (control relay 210 having a duplicate set of contacts for timer contacts 196A). Also, the count coil 212K of timer 212 is energized which initiates the counting of complete cycles before the next reversal and traverse (if desired) of the brush carrying columns. Likewise pneumatic timer 213 is energized activating delay contacts 213A to allow proper response time for the load control relays 190 and 190′ to react.

The contacts 196C are closed by timer 196 just before the end of a machine cycle, energizing control relay 211 coil to close the normally open contacts 211A, B, C and D and open normally closed contacts 211E and F (control relay 211 being a duplicate set of contacts for timer contacts 196C). Closing of timer contacts 196C also activates latch coil 214L or unlatch coil 214U of the mechanically held latching relay 214. When the brush drive motors are running forward, contacts 215 and 215′ are closed allowing latching coil 214L to be energized. When the brush drive motors are running in the reverse direction, contacts 216 and 216′ are closed allowing unlatching coil 214U to be energized. Energizing the latch coil 214L of control relay 214 closes the normally open contacts 214A, B, C and D setting up the brush drive circuits for reverse rotation of the brushes and the column traversed circuits for reverse position. Energizing the unlatch coil 214U of control relay 214 restores relay 214 to its normal position, again closing the normally closed contacts 214E, F, G and H and setting up the brush drive circuits for (arbitrary) forward direction and the brush column traverse circuits for (arbitrary) forward position.

With the selector switch 217 ("work holder #1 off-on") and 217′ (work holder #2 off-on) manually set to the "on" position thereby closing their respective contacts 217A and 217A′ and opening their respective contacts 217B and 217B′, manually depressing the "motor start" button 218, thus closing its normally open contact 218A in series with the normally closed "motor stop" button 219, energizes the coils of motor starters 220 and 220′ and causes lamps 221 and 221′ to be lighted on the panel, such energization of coils 220 and 220′ closing contacts 220A, B, C and D and 220A′, B′, C′ and D′. Such closing of contacts 220A and 220A′, in parallel with the motor start button contact 218A and in series with each other, holds the coils 220 and 220′ energized after the motor start button 218 is released. The aforesaid selector switch contacts 217B and 217B′, in series parallel combination with starter contacts 220A and 220A′, shunt out contact 220A when work holder No. 1 is set to "off" and/or shunt out contact 220A′ when work holder No. 2 is set to "off" thus allowing coil 220 to be held energized without coil 220′ so being, or vice versa. Closing of the aforesaid starter contacts 220B and 220B′ starts the motors 55 and 55′ in each work holder to rotate the chuck of that work holder. Thus it may be seen that the selector switch 217 ("work holder No. 1 off-on") and the selector switch 217′ ("work holder No. 2 off-on") permit the operator to shut off the motor (and, as is described below, the solenoid valve) of either or both work holders. Other contacts 220C and D of coil 220 and 220C′ and D′ of coil 220′ ensure that there will be no brushing action at a respective station unless the chuck at that particular station is rotating. Contacts 217C and 217C′ of the "work holder off-on" selector switches, each closed when its aforesaid switch is set to the "off" position and each in parallel with its respective starter contact 220D and 220D′, allow the individual brushes to be rotated for set-up or other purposes. Manual motor stop switch 219 is included in series with the holding circuits of coils 220 and 220′ to allow stopping motors 55 and 55′ and through the consequent opening of contacts 220C and 220C′ to stop motors 124 and 124′.

When the "brush drive hand-off-auto" selector switch 222 having contacts 222A and B is set to automatic position (contact 222A closed and contacts 222B open), the automatic brush reversing power leg 223 of the circuit is energized, setting the brush drive selector switch 224 to "automatic" so that its contacts 224A and B are closed for automatic reversal and setting the brush head column traverse selector switch 225 to "automatic" so that its contact 225A is closed for corresponding automatic traverse. When the machine cycle is initiated as described above and the contact 210B of relay 210 closes, the clutch coil 212CL of the brush reversal counter 212 is energized, closing holding contact 212A and rendering the action of count coil 212K previously described effective. Energizing the timer 212 clutch coil also closes the contact 212B to hold both the brush motor start circuits energized through the closing of contact 210C of aforementioned relay 210. Providing the chuck motor 55 is running, thus contact 220C being closed (where the following explanation relates to one station only, it will be understood to be equally applicable to the other station, the various elements of the second station being identified by prime numbers), the normally closed contact 214E of latching relay 214 permits the energization of auxiliary contact relay 215, thereby closing contact 215B to cause the energization of brush drive motor starter 225 and cause lamp 226 to be illuminated at the panel, such energization of coil 225 closing contact 225A to start the brush motor 124 in a forward direction. The interlock contact 225B holds the coils 215 and 225 energized. At the end of the brushing cycle when coil 214L is energized, as described above, closing contact 214A to energize the reverse motor starter coil 227, however, such latter coil is incapable of energization as long as the normally closed contact 225C of the forward motor starter 225 is held open by the energization of coil 225.

After a predetermined number of impulses of count coil 212K, contact 212A opens allowing the counter clutch 212CL to be de-energized at the end of that brushing cycle when contact 210B of relay 210 opens and, at the end of that brushing cycle, relay 210 contact 210C opens and with timer contact 212B previously opened through the aforementioned de-energization of clutch 212CL, de-energizes relay 215 and forward motor starter 225, stopping the brush drive motor 124. At the beginning of the next brushing cycle, the automatic brush reversing power leg 223 is again energized as described above but since relay 214 is now latched up, closing contact 214A, the motor 124 will start in the reverse direction through the energization of relay 216 and motor starter 227 causing contacts 227A to be closed. Lamp 228 is illuminated on the panel. Contact 227B holds the coils 216 and 227 energized and contact 227C prevents the energization of coils 215 and 225. The latching relay coil 214U will then be energized also as described above, closing the aforementioned normally closed contact 214E and thereby setting up the circuit to provide forward brush rotation at the end of the count of timer 212.

Prior to the start of the brushing cycle the brush traverse power leg 229 will be energized through the normally closed contacts 210E, 211E and 212C. The normally closed contact 214G of latching relay 214 permits the energization of solenoid valve coil 229F, applying air to the aforementioned traverse cylinder 116 and thereby moving the brush head 2, and/or holding it in the forward position. When timer 212 has completed its count cycle, de-energized its clutch 212CL, and stopped the brush motor 124, contact 212C will close but since control relay 214 is latched up opening contact 214G and closing contact 214C, the coil 229R will be energized applying air to the opposite end of the traverse cylinder moving the brush head to the reverse position. At the end of the next count cycle when control relay 214 is again unlatched, the brush head will return to the forward position. Thus, through the action of control relay 214, the position of the brush heads always corresponds to the direction of rotation of the brush motors.

When the contact 222B of the "brush drive hand-off-auto" selector switch 222 is closed (i.e. switch set to "hand" position), the "hand" brush drive power leg 230 of the circuit is energized setting the brush motor start circuit for manually selection of direction by setting the brush drive selector switch so that the contact 224C (for forward direction) or 224D (for reverse direction) is closed. When the brush motor starter is powered from the aforementioned "hand" brush drive power leg 230 of the circuit, the brush motor 124 will start through contact 220D when its corresponding chuck motor 55 is started unless the work holder is turned off as explained above in which case the brush drive will be started through the selector switch contact 217C (as explained above with regard to hand operation). Manual positioning of the brush head is accomplished by setting the traverse selector switch so that contact 225B for forward position or 225C for reverse position is closed.

As the work-piece W is indexed toward the work-piece holder by the conveying mechanism, the normally open contact of limit switch 231 (at the first station) is momentarily closed, energizing relay 232 and closing contact 132A which thereby holds relay 232 energized and causing a lamp 133 to be illuminated on the panel. At the end of each brushing cycle, when both relay 209 and 212 are simultaneously energized for a very short period of time, due to overlapping action of timer contacts 196A and C, contacts 210F and 211F are both opened momentarily. This momentary break in the circuit de-energizes relay 232 and allows it to detect the next work-piece as it is indexed. The indexing of a work-piece and the energization of relay 232 allows the chuck to lift, the wear feed motor 88 to operate and brushing compound to be applied to the brush at the station as described below. Contact 218B of the "motor start" push button 218 energizes the relay 232 at the time this button is manually depressed to start the motors since there would not normally be an index prior to the first brushing operation of the machine.

A contact 213A of the aforementioned "on delay" pneumatic timer 213 (timed to close as the work-piece touches the brush) closes and remains closed until the end of the brushing cycle, energizing load control shunt relay 234, "on delay" pneumatic timer 235 and illuminating lamp 236 on the panel. Normally closed contacts 234A and B of relay 234 are opened, allowing the current of the brush motors to pass through the current transformer of their respective electronic load control devices 189 and 189'. The shunt relay 234 protects the aforementioned current transformers 236 and 236' from the starting in-rush current of the brush motors. Timer 235 provides a delay to allow the load relay 190 to react to the current of brush drive motor 124. With selector switch 237 ("load level adjust-run") set to "adjust" contact 237A is closed in series with contact 234C of shunt relay 234 to hold the shunt relay energized to permit load level adjustments. Contact 237B is open in the "adjust" position of aforesaid selector switch 237 thereby stopping timer motor 196M and in effect lengthening the brushing cycle time until aforesaid adjustments are completed and selector switch 237 is set to "run" closing contact 237B restarting the timer motor 196M.

With the "wear feed off-on" selector switch 238 set to "on," the aforementioned timer 235A contact closed, contact 199C closed, contact 232B closed (indicating a work-piece at its station), the wear feed motor starter circuit 239 is energized. When the current consumption of the brush drive motor 124 drops below a predetermined load level, relay 190 is energized through the action of the commercially available electronic load control device 189. When contact 190A is closed a lamp 240 on the panel is illuminated and the wear feed motor starter 241 is energized, closing contact 241A to start the wear feed motor 88 which, through the above-described mechanical means, lifts the work-piece up against the brush with consequent increase in the motor load. When the current level of motor 124 returns to the aforementioned predetermined level, the action of load control device 189 de-energizes relay 190 to stop motor 88 and close contact 190B to illuminate lamp 242 on the panel.

When the wear feed motor 88 drive is engaged with the lift screw closing limit switch 243, with the power on, and contacts 193D and E closed, solenoid 154 at the first station is energized as the wear feed motor 88 rotates, causing a cam 244 on the manual drive shaft 98 to close limit switch 245 at such first station once during each wear feed drive revolution. This solenoid 154 causes the compound gun 139 to feed downwardly by means of the mechanical linkage previously described.

Holding relay 199 is energized at the time the machine is started as described above. When a brush becomes fully worn, the rising chuck trips limit switch 198 at the end of the upward stroke of the chuck lift cylinder. Opening the normally closed contact of limit switch 198 interrupts the current to the holding relay 199 and causes such relay to drop out. This action in turn opens contact 199B to prevent further automatic recycling of the machine, opens contact 199C to prevent further wear feed travel, and closes contact 199D to light a red pilot light 246 on the panel as a signal that the brush has been worn down to a point where it must be changed.

This rising chuck trips limit switch 247 just before the brush becomes fully worn, causing a panel light 248 and/or other signal to be given as a warning that the brush is reaching the end of its useful life. Limit switch 247' is stripped in similar fashion at the second station to furnish a warning of brush wear there.

Contact 197A of the compound timer 197 closes for a short pre-set interval at the beginning of each brushing cycle. With contacts 232C closed as described above and contacts 215C or 216C (brush motor running in either direction) closed, the closing of contact 197A energizes solenoid valve 249 coil to feed air to the gun 139, such air forcing compound on and into the brush as the latter rotates. By setting the "compound applicator "hand-off-auto" selector switch 250 to the hand position closing contact 250A and opening contact 250B (250B being closed in "auto" position of the switch) and depressing "manual gun" push button 251, valve 249 may be energized to apply any required amount of compound to the brush for set-up purposes.

A contact 210D of auxiliary contact relay 210 aforementioned, when closed in conjunction with relay contact 232D (a work-piece being at the station) and with the "work holder off-on" selector switch 217 "on," contact 217C being closed, energizes valve 252 feeding air to the lift cylinder 69 so as to raise the chuck and bring the work-piece in contact with the brush. At the end of the brushing cycle time, contact 196B of the timer 196 opens stopping the timer motor 196M, contact 196A also opens de-energizing relay 210 causing contact 210D to open de-energizing valve 252, thus reversing the valve, which in turn reverses the air to the lift cylinder and brings the chuck and work-piece down.

At the end of the brushing cycle time when relay 210 is de-energized as described above, contact 210G is closed and with the "part feed off-on" selector switch 253 "on," either contact 254A or 255A closed, contact 211B closed, limit switch 256 (incoming work-piece fully in line) closed, limit switch 257 (first station chuck down) closed, and limit switch 257' (second station chuck down) closed, valve coil 258F is energized to admit air to cylinder 19 causing the feed mechanism to index forward. This closes limit switch 259, energizing valve coil 260F to admit air to cylinder 24 to rock shaft 16 to cause the index fingers to raise. Energizing valve 260F also admits to cylinder 166 to cause a work-piece to be clamped in the rock-over mechanism. With limit switch 261 (rock-over in a position in line with the conveyor) closed, and contact 211C closed, holding relay 254 is energized. Closing of contact 254A of relay 254 allows the aforementioned part feed to take place, closing of contact 254B maintains the circuit to relay 254 after the rock-over takes place opening limit switch 261, a normally closed contact 254C of relay 254 opening to prevent holding relay 255 from being energized when the rock-over takes place and limit switch 262 is closed. A contact 254D of relay 254 closes to cause the rock-over to take place as described below and a contact 254E of relay 254 closes to allow the part feed mechanism to return as described below. As the part feed fingers 15 are raised, limit switch 208 is opened, de-energizing the clutch coils 196CL and 197CL of timers 196 and 197 and causing those timers to reset. This action opens contact 196C, causing relay 211 to be de-energized, and closes contacts 196B and 197B causing the timer motors to restart. The de-energization of relay 211 and subsequent opening of contact 211B causes valve coils 258F and 260F to be de-energized but since these are double solenoid valves, the pneumatic circuits through these valves remain the same. Limit switch 263 closes when the index fingers 15 are raised and since the aforementioned contact 254D is closed, valve coil 264R is thereupon energized causing the rock-over to take place. Such rocking-over opens limit switch 261 and closes limit switch 262 and since relay contact 254E is closed, valve coil 258R is energized causing the part feed mechanism to return. In a similar fashion after the following brushing cycle, limit switch 262 energizes holding relay 255 closing contacts 255A, B, D and E and opening contact 255C causing 264F to be energized rocking the work-piece over closing limit switch 261 thus again returning the part feed. When the part feed is fully back to its initial position, limit switch 206 closes, energizing auxiliary contact relay 207. With contact 207B closed, valve coil 260R is energized, unclamping the rock-over and causing the feed fingers to come down. Limit switch 208 closes, and the machine is ready to recycle. At the start of the next cycle when relay 210 is energized, contact 210G opens de-energizing relay 254 or 255 thus closing contacts 254C and 255C to allow the opposite relay to be energized during the next rock-over sequence.

Other modes of applying the principle of the invention may be employed, change being made as regards the details described, provided the features stated in any of the following claims or the equivalent of such be employed.

I therefore particularly point out and distinctly claim as my invention:

1. In a power brushing machine, two horizontally spaced brushing stations, a power driven rotary brush at each said station, a horizontal conveyor disposed beneath said brushes and adapted to transfer work-pieces successively into positions vertically spaced below said respective brushes, work holding means mounted for vertical reciprocation operative to elevate work-pieces at said stations from said conveyor into brush engaging position and to return the brushed work-pieces to said conveyor, and work-piece turn-over means associated with said conveyor intermediate said stations operative to turn over work-pieces for brushing at said second station of sides opposite to their sides brushed at said first station.

2. The brushing machine of claim 1 wherein said work holding means are also mounted for rotation about vertical axes while presenting the work-pieces to said brushes.

3. The brushing machine of claim 1 wherein said brushes are also mounted for reciprocation in horizontal planes.

4. The brushing machine of claim 1 wherein said work holding means are also mounted for rotation about vertical axes while presenting the work-pieces to said brushes, and said brushes are also mounted for reciprocation in horizontal planes.

5. The brushing machine of claim 1 wherein said conveyor comprises a longitudinally reciprocable member, a plurality of work-piece engaging devices thereon, means operative to reciprocate said member and said devices a predetermined distance, and means operative to rock said reciprocable member to shift said devices into and out of work-piece engaging position.

6. In a power brushing machine having a power driven rotary brush, and means mounting and driving said brush; a horizontal conveyor disposed beneath said brush and adapted to transfer work-pieces successively to a brushing station below said brush, said conveyor comprising a horizontally longitudinally reciprocable member, a plurality of work-piece engaging devices thereon, means operative to reciprocate said member and devices a predetermined distance, and means operative to rock said reciprocable member about its longitudinal axis to lower and raise said devices into and out of work-piece engaging position.

7. In a power brushing machine having a power driven rotary brush, and means mounting and driving said brush; a horizontal conveyor disposed beneath said brush and adapted to transfer work-pieces successively to a brushing station below said brush, work holding means at said station mounted for vertical reciprocation operative to lift a work-piece into brush engaging position and then to redeposit the brushed work-piece in position for further translation by said conveyor, and power means operative thus to reciprocate said work holding means.

8. In a power brushing machine having a power driven rotary brush, and means mounting and driving said brush; a horizontal conveyor disposed beneath said brush and adapted to transfer work-pieces successively to a brushing station below said brush, said conveyor comprising a longitudinally reciprocable member, a plurality of work-piece engaging devices thereon, means operative to reciprocate said member and devices a predetermined distance, and means operative to rock said reciprocable member to shift said devices into and out of work-piece engaging position, and work holding means at said station mounted for vertical reciprocation operative to lift a work-piece into brush engaging position and then to redeposit the brushed work-piece in position for further translation by said conveyor.

9. In a power brushing machine having a power driven rotary brush, and means mounting and driving said brush; a horizontal conveyor disposed beneath said brush and adapted to transfer work-pieces successively to a brushing station below said brush, work holding means at said station mounted for vertical reciprocation operative to lift a work-piece into brush engaging position and then to redeposit the brushed work-piece in position for further translation by said conveyor, and means operative to rotate said work holding means and work about a vertical axis.

10. In a power brushing machine having a power driven rotary brush, and means mounting and driving said brush; work holding means operative to lift a work-piece into brush engaging position and then to lower such work-piece out of contact with said brush comprising an outer vertical spindle and an inner tubular spindle, said outer spindle being supported in a lower thrust bearing and an upper anti-friction bearing, a pull rod within said inner tubular spindle, means securing said outer spindle, inner spindle, and pull rod for rotation together and for vertical reciprocation of said inner spindle and pull rod relative to said outer spindle, power means for driving said outer spindle, a rocker arm pivotally mounted for rocking about a horizontal axis, a collar encircling the upper portion of said inner spindle where the latter projects above said outer spindle for rotation relative thereto but engaging the same for vertical reciprocation therewith, a vertically disposed pneumatic piston-cylinder assembly beneath said rocker arm, means pivotally connecting said rocker arm and assembly for rocking of said arm by reciprocation of said piston; means adjustably vertically mounting said piston-cylinder assembly comprising a servo motor, screw means mounting said piston-cylinder assembly driven by said motor to raise and lower the same, means for manually disengaging said motor from said screw means, means for manually turning said screw means, an electric motor driving said brush, means responsive to a drop in the amount of current consumption of said latter motor operative to energize said servo motor to drive said screw to elevate said piston-cylinder assembly to ensure greater pressure between work carried by said holder and said brush, load control means for said brush drive motor operative to de-energize said servo motor when the current level of said brush drive motor reaches a predetermined level; and work chucking means comprising chucking fingers pivotally mounted on the upper end of said inner spindle, a cam portion on the upper end of said pull rod operative to actuate said chucking fingers when said rod is reciprocated relative to said inner spindle, a stop plate through which the lower portion of said rod projecting below said spindles passes, resilient means urging said stop plate downwardly, resilient means interposed between said stop plate and a shoulder on said rod normally to limit downward reciprocation of said rod relative to said inner spindle, means positively limiting downward movement of said stop plate, and a stop element on the lower end of said rod, whereby upon lifting of said inner spindle by said rocker arm said rod will rise therewith until said stop element on the lower end of said rod engages the underside of said resiliently backed stop plate causing said cam portion to actuate said chucking fingers to chuck the work, with further upward reciprocation of said inner spindle and work being accommodated through yielding of said resilient means.

11. In a power brushing machine having a power driven rotary brush, and means mounting and driving said brush; work holding means operative to lift a work-piece into brush engaging position and then to lower such work-piece out of contact with said brush comprising an outer vertical spindle and an inner tubular spindle, said outer spindle being mounted for rotation about its axis, a pull rod within said inner tubular spindle, means securing said outer spindle, inner spindle, and pull rod for rotation together and for vertical reciprocation of said inner spindle and pull rod relative to said outer spindle, power means for driving said outer spindle, a rocker arm pivotally mounted for rocking about a horizontal axis, a collar encircling the upper portion of said inner spindle where the latter projects above said outer spindle for rotation relative thereto but engaging the same for vertical reciprocation therewith, a vertically disposed pneumatic piston-cylinder assembly beneath said rocker arm, means pivotally connecting said rocker arm and assembly for rocking of said arm by reciprocation of said piston; and work chucking means comprising chucking fingers pivotally mounted on the upper end of said inner spindle, a cam portion on the upper end of said pull rod operative to actuate said chucking fingers when said rod is reciprocated relative to said inner spindle, a stop plate through which the lower portion of said rod projecting below said spindles passes, resilient means urging said stop plate downwardly, resilient means interposed between said stop plate and a shoulder on said rod normally to limit downward reciprocation of said rod relative to said inner spindle, means positively limiting downward movement of said stop plate, and a stop element on the lower end of said rod, whereby upon lifting of said inner spindle by said rocker arm said rod will rise therewith until said stop element on the lower end of said rod engages the underside of said resiliently backed stop plate causing said cam portion to actuate said chucking fingers to chuck the work, with further upward reciprocation of said inner spindle and work being accommodated through yielding of said resilient means.

12. In a power brushing machine having a power driven rotary brush, and means mounting and driving said brush; work holding means operative to lift a work-piece into brush engaging position and then to lower such work-piece out of contact with said brush comprising an outer vertical spindle and an inner tubular spindle, said outer spindle being mounted for rotation about its axis, a pull rod within said inner tubular spindle, means securing said outer spindle, inner spindle, and pull rod for rotation together and for vertical reciprocation of said inner spindle and pull rod relative to said outer spindle, power means for driving said outer spindle, a rocker arm pivotally mounted for rocking about a horizontal axis, a collar encircling the upper portion of said inner spindle where the latter projects above said outer spindle for rotation relative thereto but engaging the same for vertical reciprocation therewith, a fluid pressure piston-cylinder assembly operative to rock said arm to raise and lower said inner spindle and pull rod, work chucking means on the upper end of said inner spindle, means effective resiliently yieldingly to limit upward movement of said rod, and means on the upper end of said rod operative to actuate said work chucking means in response to upward movement of said inner spindle relative to said rod.

13. In a power brushing machine having a power driven rotary brush, and means mounting and driving said brush; work holding means operative to lift a work-piece into brush engaging position and then to lower such work-piece out of contact with said brush comprising a vertical spindle mounted beneath said brush, means operative to drive said spindle, means operative to reciprocate said spindle vertically, work chucking means on the upper end of said spindle, and means operative in responsive to upward reciprocation to actuate said chucking means to chuck such work and responsive to downward reciprocation to de-chuck such work.

14. The machine of claim 13, including means responsive to a predetermined drop in the power requirement of said brush drive means to elevate the upper limit of reciprocation of said spindle.

15. In a power brushing machine having a power driven rotary brush, and means mounting and driving said brush; work holding means operative to lift a work-piece into brush engaging position and then to lower such work-piece out of contact with said brush comprising work supporting means mounted for rotation about an axis generally normal to the axis of rotation of said brush, means operative to reciprocate said work supporting means toward and away from said brush, and means responsive to a predetermined drop in the power requirement of said brush drive means to increase the reciprocation of said work supporting means toward said brush.

16. In a power brushing machine having a power driven rotary brush, and means mounting and driving said brush; a horizontal conveyor disposed beneath said brush and adapted to transfer work-pieces successively to a brushing station below said brush, and work holding means at said station mounted for vertical reciprocation operative to lift a work-piece into brush engaging position and then to redeposit the brushed work-piece in position for further translation by said conveyor; said brush mounting and driving means including a stand mounted for pivotal movement about a vertical axis, horizontal ways of supporting said stand for reciprocation therealong, power means for thus reciprocating said stand, a brush head pivotally secured to the upper portion of said stand for angular adjustment relative thereto about the same vertical axis as the aforesaid axis of pivotal movement of said stand, and a motor on said head for driving said brush.

17. In a power brushing machine, two horizontally spaced brushing stations, a power driven rotary brush at each said station, a horizontal conveyor disposed beneath said brushes and adapted to transfer work-pieces successively into positions vertically spaced below said respective brushes, work holding means mounted for vertical reciprocation operative to elevate work-pieces at said stations from said conveyor into brush engaging position and to return the brushed work-pieces to said conveyor, and work-piece turn-over means associated with said conveyor intermediate said stations operative to turn over work-pieces for brushing at said second station of sides opposite to their sides brushed at said first station, said turn-over means comprising work-piece clamping means operative to grip a work-piece during the turn-over operation and then to release such work-piece for further transfer by said horizontal conveyor.

18. In a power brushing machine, a brushing head, a power driven rotary brush carried by said head, a housing enclosing said brush provided with an opeing for engagement of said brush with the work, suction outlets from said housing closely adjacent such opening on each side thereof in the direction of rotation of said brush, said hood having a second opening therein generally diametrically opposite to such opening for engagement of said brush with such work, a brushing compound spray gun directed through such second opening toward the outer periphery of said brush, and a curved baffle adjustably mounted within said hood shaped closely to conform to the outer periphery of said brush adjacent said gun.

References Cited in the file of this patent

UNITED STATES PATENTS

| | | |
|---|---|---|
| 856,662 | Smith | June 11, 1907 |
| 956,762 | Furrow | May 3, 1910 |
| 1,059,877 | Keighley | Apr. 22, 1913 |
| 1,086,745 | Athy | Feb. 10, 1914 |
| 1,261,432 | Parslow | Apr. 2, 1918 |
| 1,391,875 | Beck | Sept. 27, 1921 |
| 1,512,688 | Henry | Oct. 21, 1924 |
| 1,579,056 | Arter | Mar. 30, 1926 |
| 1,736,159 | Johnson | Nov. 19, 1929 |
| 1,902,164 | Haegg | Mar. 21, 1933 |
| 2,044,394 | Marchand | June 16, 1936 |
| 2,054,932 | Fleming | Sept. 22, 1936 |
| 2,332,992 | Davis | Oct. 26, 1943 |